July 24, 1962  G. RUSSELL ETAL  3,045,911
AUTOMATIC CONTROL SYSTEMS
Filed July 1, 1957  12 Sheets-Sheet 1

CLASSIFICATION SYSTEM

CONDITIONAL PROBABILITY SYSTEM

July 24, 1962  G. RUSSELL ETAL  3,045,911
AUTOMATIC CONTROL SYSTEMS
Filed July 1, 1957  12 Sheets-Sheet 2
FIG. 5a
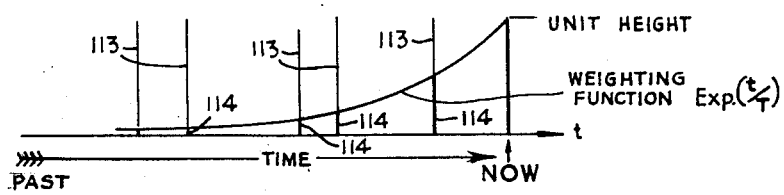
FIG. 5b
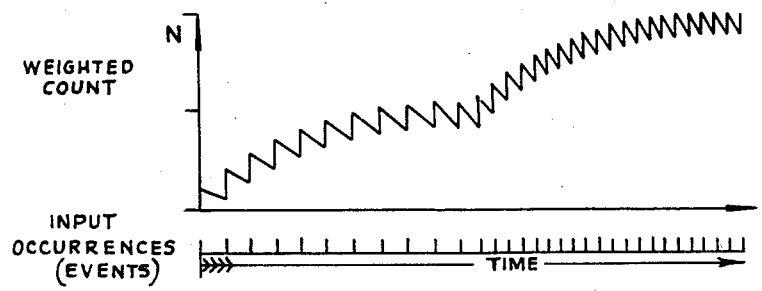
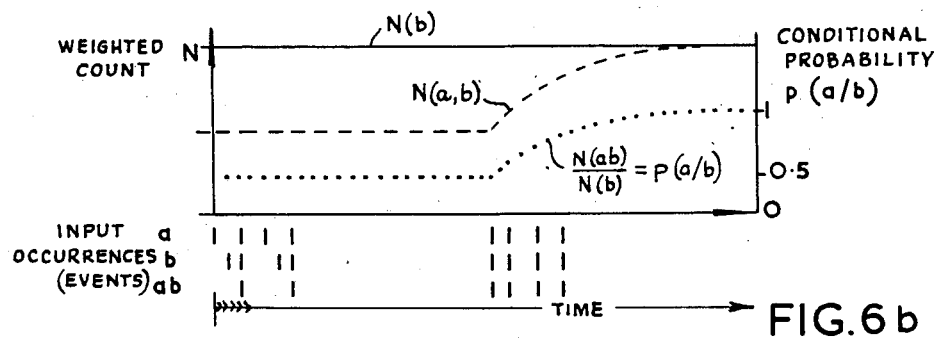
FIG. 6a
FIG. 6b
FULL LINE N(b); BROKEN LINE N(ab);
DOTTED LINE p(a/b)

July 24, 1962   G. RUSSELL ETAL   3,045,911
AUTOMATIC CONTROL SYSTEMS
Filed July 1, 1957   12 Sheets-Sheet 3

Inventors
Graham Russell and Albert M. Uttley
By Stevens, Davis, Miller & Mosher
Their Attorneys July 24, 1962  G. RUSSELL ETAL  3,045,911
AUTOMATIC CONTROL SYSTEMS
Filed July 1, 1957  12 Sheets-Sheet 8

Inventors
Graham Russell and Albert M. Uttley
By
Stevens, Davis, Miller & Mosher
Their Attorneys

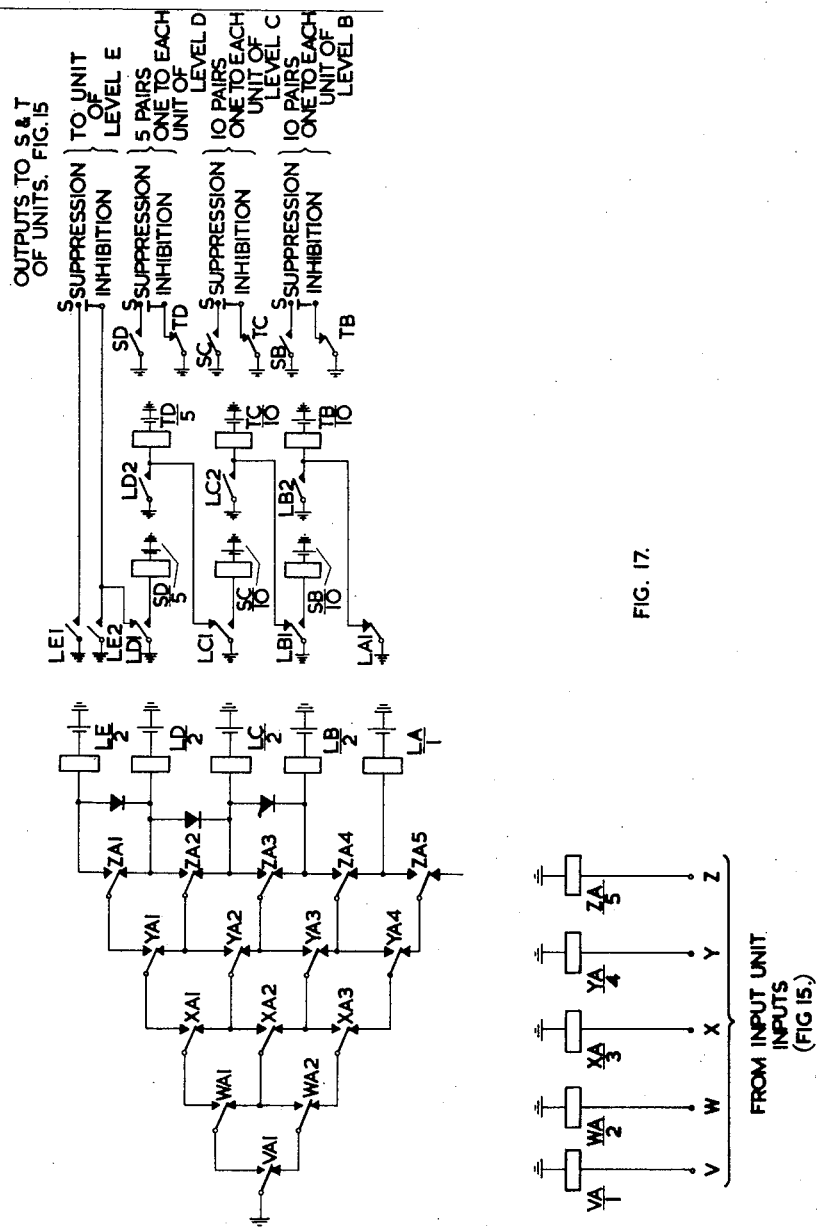
FIG. 17.
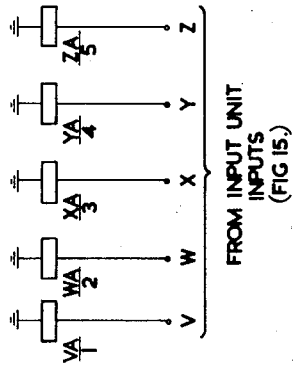

3,045,911
AUTOMATIC CONTROL SYSTEMS
Graham Russell, Malvern, and Albert Maurel Uttley, Esher, England, assignors to National Research Development Corporation, London, England, a British corporation
Filed July 1, 1957, Ser. No. 669,255
Claims priority, application Great Britain July 5, 1956
9 Claims. (Cl. 235—151)

This invention relates to automatic control systems.

A common form of automatic control system is the servo-control system commonly known as closed-loop control. Basically, in a servo-control system a controlled element is controlled by one or more controlling elements which exert control in response to measurements or indications describing the behaviour of the controlled element. Thus the servo-control system can be thought of as based on one or more closed-loops around which control and consequence of control follow one another continuously. The term, feedback, is often used to describe the operation of such a system.

Although the continuous nature inside a closed feedback loop is understood, it is convenient, as a practical matter, to use such terms as input and output and other terms to denote points at which it is usual to examine the conditions existing in the loop at a given time. Whether a given observed condition denotes control or consequence will, of course, depend on the direction round the loop to which the observation is related.

There are many instances where servo-control systems are used; such as process plants for example whose function is the manufacture of chemical products or, in a large ship or possibly an aircraft, for example where the function is the automatic steering of the vessel.

In these instances it will generally be found that, although such a system gives adequate control when the prevailing conditions under which the system is being used fall within the limits for which the system has been designed, when some departure outside these limits occurs the system fails to adjust itself to the changed conditions and ceases to operate satisfactorily. For example in the case of a process plant a change in quality or form of an input material could render inapplicable a predetermined range of control values under which a servo system stabilised and controlled a given phase of the process, even though the servo system were quite capable of giving effective control if it could somehow be recognised that such a change had occurred and a new range of control values determined by experience then injected into the servo-system.

For example, where a servo-system contains means for indicating the departure of a motor-driven pointer from a given position and operates to maintain the pointer in the given position, if the connections to say the motor were reversed so that the direction of drive of the motor for a given control input were also reversed the system would need to be changed by some external agency before it could again provide satisfactory control.

In both these examples it could happen that in the absence of intervention by an external agency the changed conditions would mean that the servo control would actually fail to exercise control; in the case of the motor-driven pointer referred to above it would insist on controlling in entirely the reverse manner even though the desired object of the control (the positional setting of the pointer) remained unaltered.

It would appear desirable then to be able to provide an automatic control system which, if new control conditions became operative, for instance in the example of the motor driven pointer, if operating conditions were reversed, would cease to attempt any control in the original manner but would learn by tentative attempts what the consequences of the new control were and would modify the control in the way the tentative attempts had indicated until the system were again operating satisfactorily.

This desideratum could be described as a form of "judgment."

It is accordingly an object of the present invention to provide an automatic control system which is capable of exercising some measure of judgment.

According to the invention therefore an automatic control system comprises a controlled element, one or more controlling elements for controlling the behaviour of the controlled element, indicating means associated with (a) the controlled element for indicating its state as controlled by the controlling means, (b) the controlling means for indicating the state of each means at it controls the controlled element, and (c) the controlled element for indicating the consequence of control relative to a predetermined behaviour of the controlled element, means for effecting random operation of the controlling means, a conditional probability computer connected to the indicating means for computing from the indications received therefrom conditional probabilities of the states of the controlling means and actuating each controlling means according to the conditional probabilities of its state overriding the random operation in doing so, and instructing means for instructing the system by simulating at the computer an indication of a desired consequence, whereby the control system learns by computing in terms of conditional probabilities the different consequences of control of the controlled element by the controlling means during random operation and adopts a desired behaviour when instructed to do so after learning.

In order to make the invention clearer the conditional probability concept will now be examined and rules derived for computing conditional probabilities. Two examples of automatic control systems, in which control is based on this concept, will be described with reference to the accompanying drawings, in which:

FIGS. 1–6 show diagrams useful in the understanding of conditional probability,

Figure 10A:
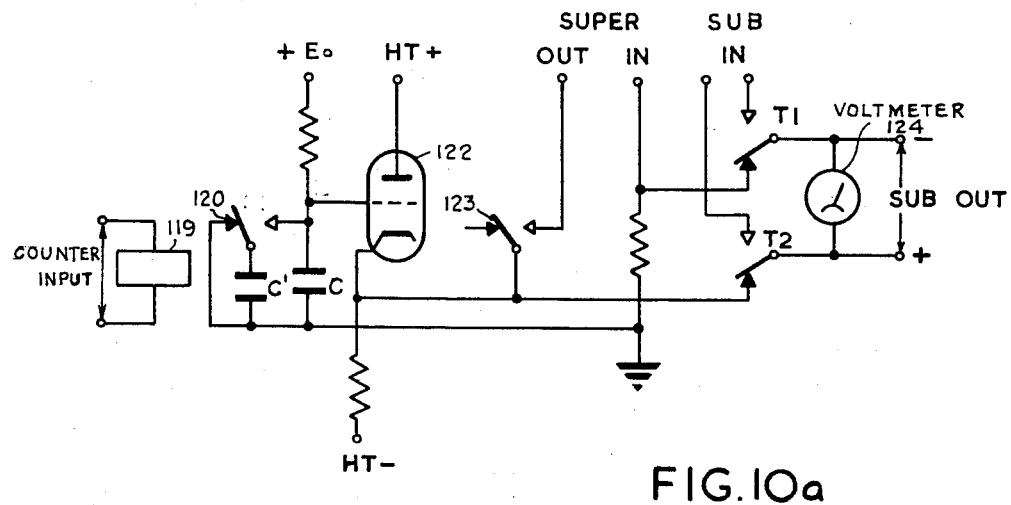
Figure 10B:
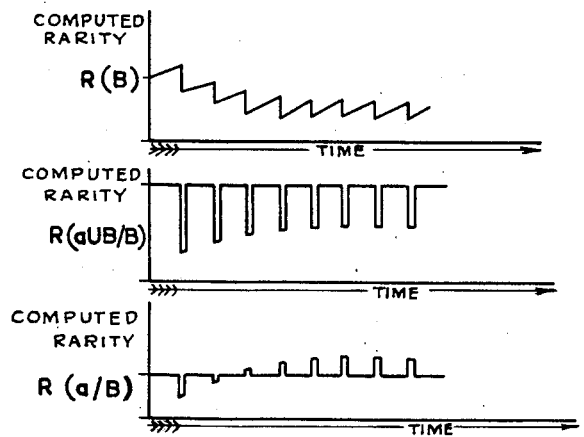
Figure 11:
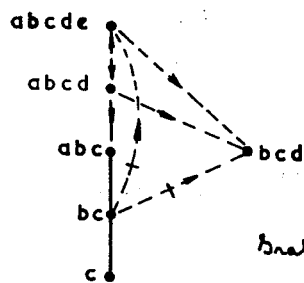
Figure 12:
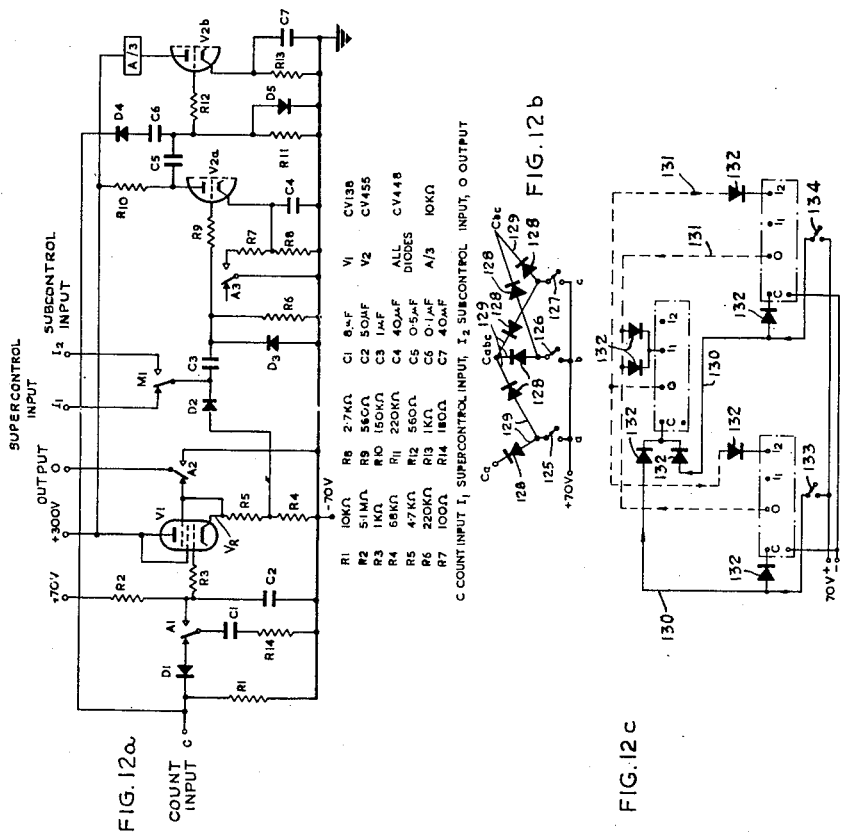
Figure 13:
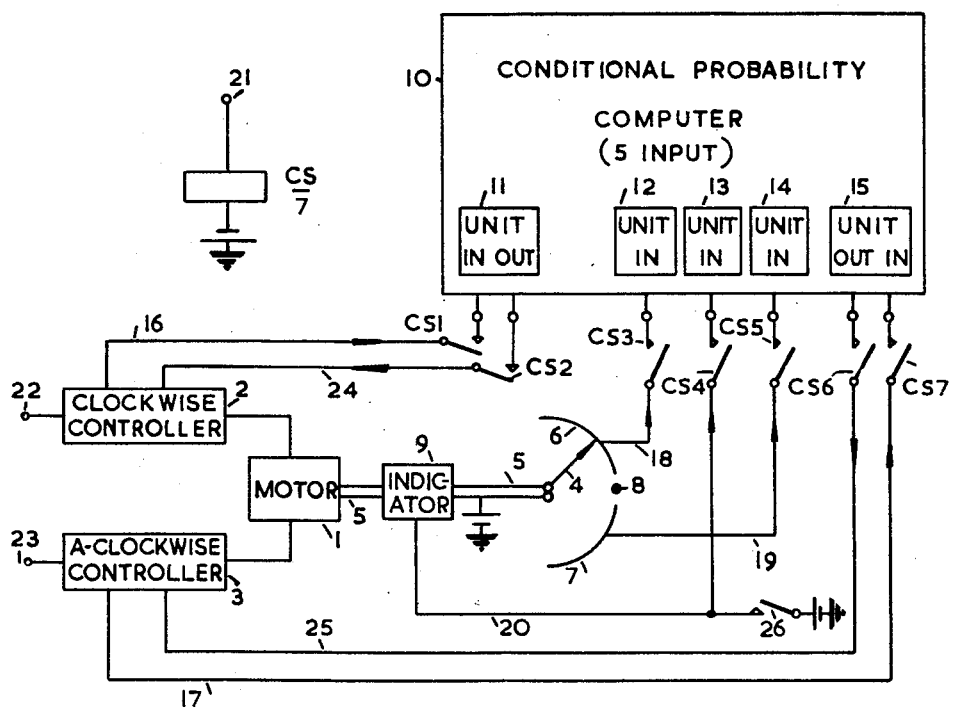
Figure 14:
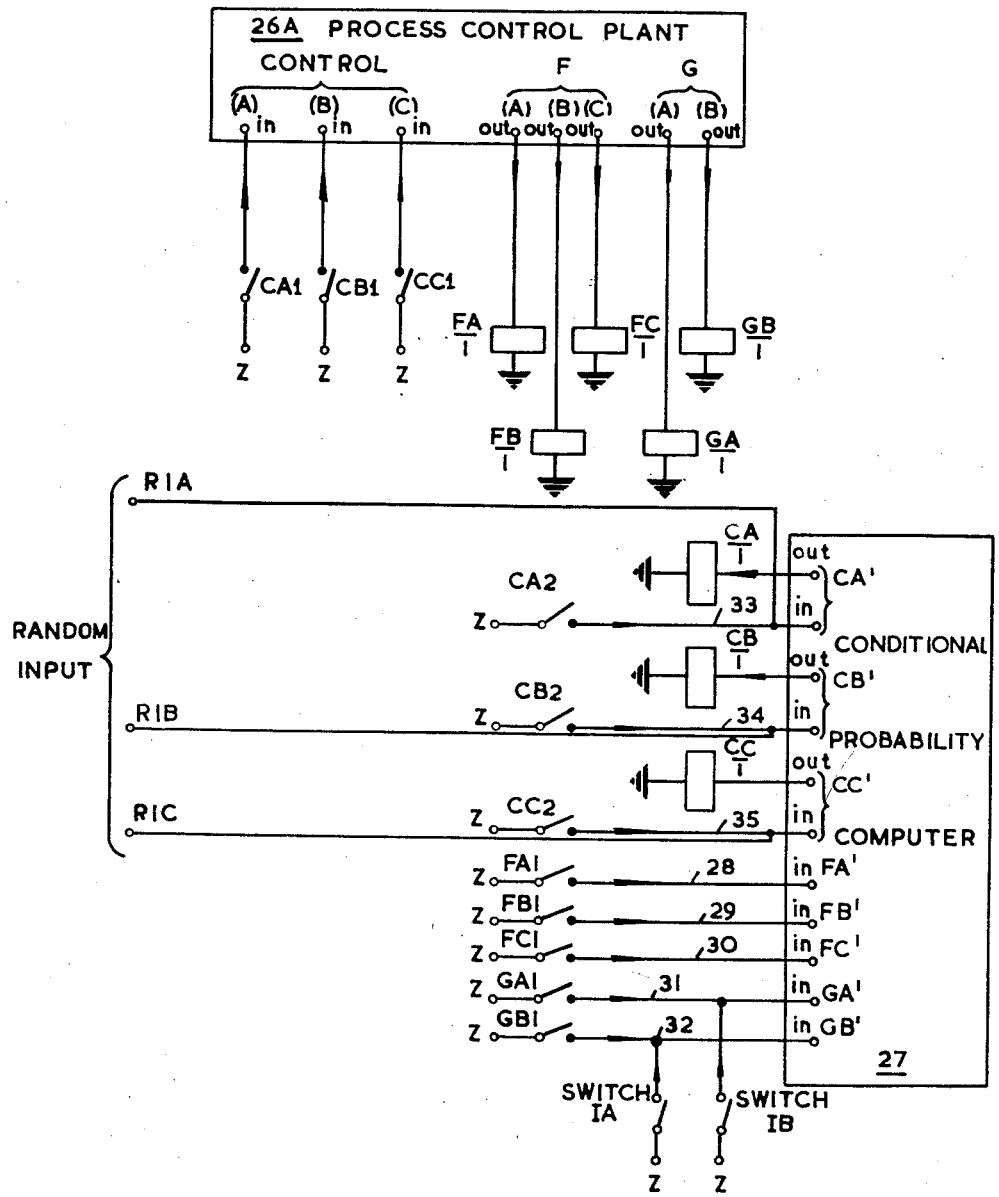
Figure 15:
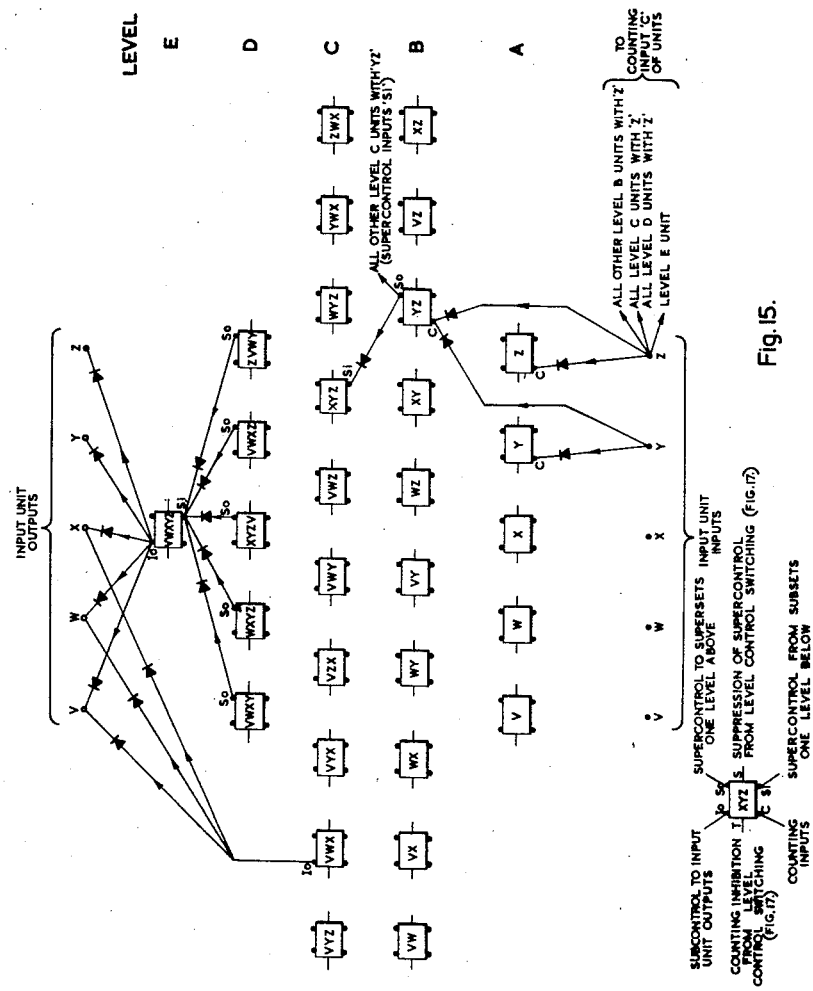
Figure 16:
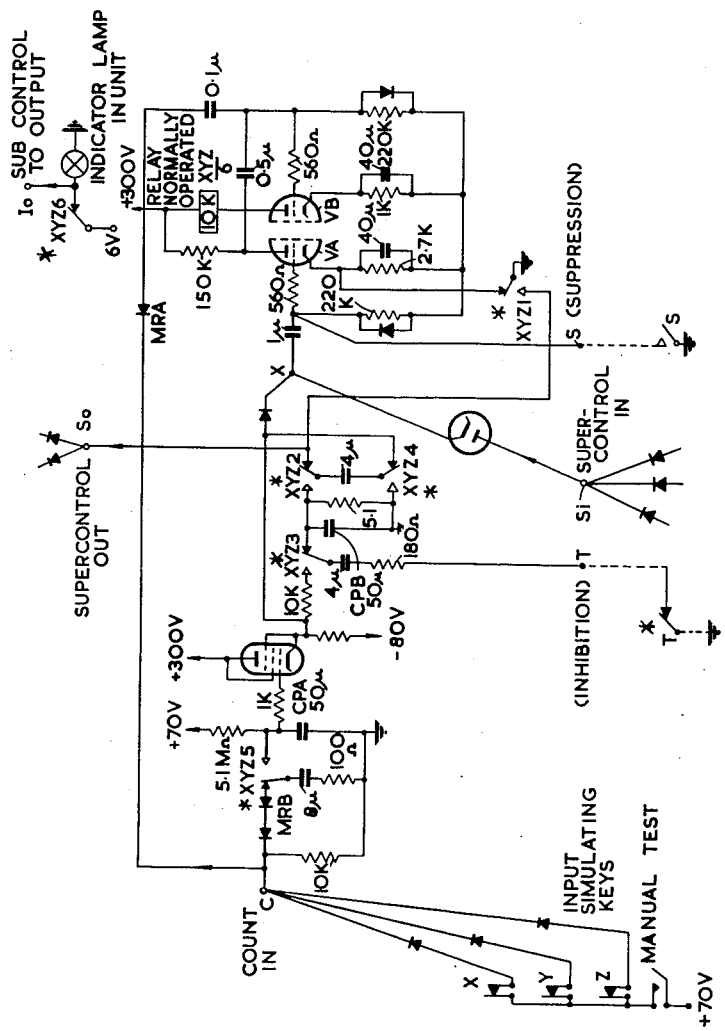

FIGS. 10(a,b) show a circuit and circuit waveforms for one unit of a conditional probability computer, FIG. 11 shows diagrammatically a condition which occurs in the operation of a five-input conditional probability computer, FIG. 12 shows a circuit of a unit for a computer, FIG. 13 shows diagrammatically an automatic control system in which control is based on conditional probability computation, FIG. 14 shows schematically a process control system in which control is based on conditional probability computation, FIG. 15 shows a configuration of counting, subcontrol and supercontrol connections for the five input unit conditional probability computer used in the arrangement of FIG. 13, FIG. 16 shows a typical basic unit of the computer of FIG. 13, and FIG. 17 shows details of level control switching for the units of the computer of FIG. 13.

INTRODUCTION TO CONDITIONAL PROBABILITY

Figure 1:
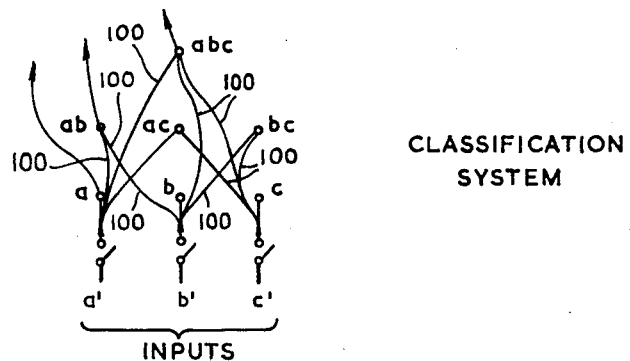
Figure 2:
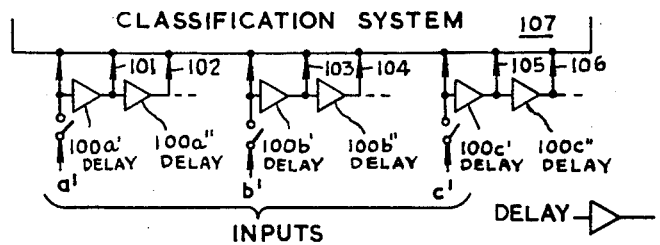

First consider a classification system consisting of a number of indicating units connected to inputs; if the principle of classification is to hold certain conditions must obtain. Firstly input signals must be effectively binary, in other words, the classification system must distinguish only two states of an input, which will be called active and inactive. Secondly, there must be large numbers of identical units connected to inputs in as many different ways as possible. A mechanism for classification, in all possible ways, of the activity in three inputs ($a'$, $b'$, $c'$) is shown in FIG. 1. There the function of each unit, designated according to the inputs connected to it by connection 100, is to indicate if all the inputs connected to it are active; such a set of active inputs will be said to define a pattern. Each unit provides a binary output from the system. Comparing the input signals to notes in music, each unit distinguishes a particular chord, a set of simultaneous signals. In the arrangement shown in FIG. 2 temporal patterns are distinguished and each input signal passes through a series of delays $100a'$, $100a''$; $100b'$, $100b''$ . . . after each of which a separate connection 101, 102, 103 . . . 106, is taken to the classification system 107.

Figure 3:
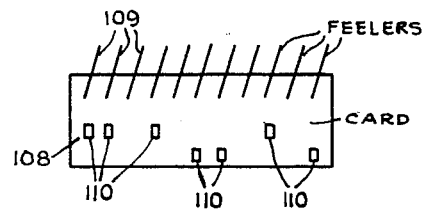

Such a principle is employed in punched card sorting machines; the card 108 passes under a row of feelers 109 as in FIG. 3 and the holes 110 in it give rise to a spatio-temporal pattern of electrical activity in the feelers. It is possible to punch a particular pattern on one card, and to arrange that the machine (a punched-card collator) examines a set of cards and places in a particular box all those possessing this pattern even through they may possess additional holes. In the machine the activity caused by the chosen pattern of holes is that of opening the lid of a box; it is determined entirely by what is connected to what in the controlling system of the machine, by considerations of permanent structure. There is no plasticity in such a system; the examination of the present card is quite unaffected by that of previous cards.

It is possible using conditional probability theory to introduce a principle of plasticity into the design of a classification system, so that the output is determined by past, as well as present, input activity. A start can first be made by defining a conditional probability classification system from which rules can be deduced logically for its design.

THE CONDITIONAL PROBABILITY SYSTEM

In a Conditional Probability System, if any set of inputs of a system becomes active the conditional probabilities of all other sets of inputs are computed on the basis of past occurrences. At this stage it will be assumed that all the necessary computations occur simultaneously and in negligible time. Corresponding to each even set of inputs one may imagine a "meter" which reads conditional probability. Suppose, for example, that in respect of inputs $a'$, $b'$, $c'$ (whose activation can be indicated conveniently by $a$, $b$ and $c$ respectively), the past has been as follows, where 1 represents activity and 0 its absence.

Input:
```
a'_____ 1 1 1 1 1 1 1 1 1 1 0 0 0 0 0 0
b'_____ 0 0 0 0 1 1 1 1 1 1 1 1 1 1 0 0 0 0
c'_____ 0 0 0 0 0 0 0 0 1 1 1 1 1 1 1 1 1 1
```

If $b$ occurs (i.e. the input $b'$ is actuated to give activity) the conditional probability of $a$ also occurring, written $p(a/b)$, is equal to 6/10; therefore if input $b'$ is actuated an $a$ meter will read this quantity; at the same time an $ac$ meter, for example, will read $p(ac/b)$ which is 2/10. Similarly, if $c$ occurs, the $a$ meter will read $p(a/c)$ which is 2/10 and the $ac$ meter will read $p(ac/c)$ which is 2/10 also. If $b$ and $c$ occur jointly the $a$ meter will read $p(a/bc)$ which is 2/6 and the $ac$ meter will read $p(ac/bc)$ which is 2/6 also. It can be seen that a system which does this must consider all possible conjunctions of $a$, $b$ and $c$ and must count the number of times each has occurred; it must therefore possess units connected to the inputs in all possible ways as in FIG. 1, in other words it must possess a classification system.

Figure 4:
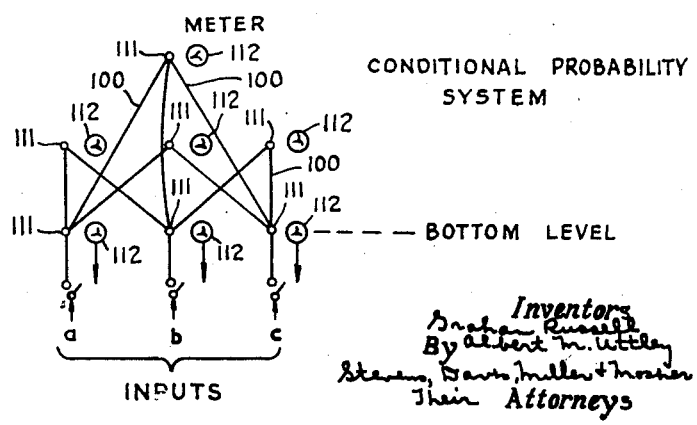

But in the conditional probability system each unit does more than indicate the presence or absence of a pattern, it must count and store that count; lastly it must possess a "meter" whose reading depends on the counts of other sets. A conditional probability system for three inputs $a$, $b$, $c$, is shown diagrammatically in FIG. 4; in addition to the connections 100 required in a classification system there are connections from units 111 to meters 112; the meters 112 but not the connections are shown; the function and plan of these new connections are discussed later. At this stage, the chosen method of computation will be indicated only briefly. Because $$p(a/b) = p(ab)/p(b)$$

then, if input $b$ is active, the reading of the $a$ meter must be the content of the ($ab$) unit divided by that of the ($b$) unit; as a matter of machine design this operation can be effected most easily if events are counted on a logarithmic scale so that division may be replaced by subtraction.

Let A and B represent two sets (patterns) of inputs whose past history is as follows so that $p(A/B) = 0.9$

```
A _____ 1 1 1 1 0 1 1 1 1 1
B _____ 1 1 1 1 1 1 1 1 1 1
```

If B now occurs alone the A meter will read 0.9. It is true that for the past ten events $p(A/B) = 0.9$ but the indication of the A meter that also at the present eleventh event the probability of A is 0.9 involves the step of induction or inference; this is the most important property of the conditional probability system.

In a conditional probability system a unit can reach a state of unit probability, i.e. certainty, in two quite different ways. Firstly the set of inputs A must be active and cause the A unit to indicate. Secondly, if in the past as shown above, one set A has always occurred with the other set B, even although set B has occurred alone, then given A, the B meter will show that $p(B/A) = 1$; in simple words, as a result of past conjunctions of A and B, B has become a sign of A. These two ways of distinguishing a pattern correspond closely to those of primary and secondary recognition discussed by philosophers, for example, refer to Price, H. M., Thinking and Experience, London 1953, Hutchinson.

In a classification system there is a flow of control from input to units and then out, as in FIG. 1, but in a conditional probability system there is a new possibility. The meters 112 at the bottom level only, which refer to single inputs $a$, $b$, $c$, can provide outputs from the system as in FIG. 4; the remaining meters 112 will indicate intermediate stages of the necessary computation. In this arrangement the flow of control is first from the inputs $a$, $b$, $c$ into the body of the system then, as a result of internal computation the control flows back on itself to the input (bottom) level to determine a degree of probability of each unobserved input in the light of what is observed now and of past conjunctions. It can be seen that such a system completely unifies the whole set of inputs $a$, $b$, $c$; the occurrence of each can modify the probability of every other.

THE WEIGHTING OF PAST EVENTS

Up to this point of the discussion all events whether recent or not, have been given equal weight in the counting of conjunctions; in consequence there are two difficulties. Firstly one may ask when each unit started to count. Secondly, since a conditional probability is the ratio of two counts, it will vary less and less as their number increases; like one's average speed on a car journey it will be less and less affected by present variations. These difficulties do not arise if past events are weighted less than present ones; this will happen if the counter is leaky. For example, if the counting is affected by placing electrical charges in a condenser with a resistance across it, the weighting function will be exponential with a time constant T equal to that of the condenser and resistance. For such a counting system, if an event now counts 1, then an event T seconds ago counts $1/e$ and an event 1T seconds ago counts $1/e^k$. The present reading of such a counter may be found as in FIG. 5a, by recording events on a time axis as lines 113 of unit height. If the weighting function $exp(t/T)$ is drawn in the same diagram, the weighted count is the sum of all the segments 114 lying below the weighting function.

The properties of the system are now greatly changed. If events have occurred at finite intervals over an infinite past the weighted count will still remain finite; it will be proportional to the area under the weighting function and to the mean frequency of events. If this frequency is suddenly doubled the weighted count will gradually settle at double the value, as in FIG. 6(a).

Now considered the effect upon conditional probabilities. Suppose that inputs $a$ and $b$ have occurred as in FIG. 6(b). The first sequence of events for which $a$ and $b$ are statistically independent, is repeated for some time; then it is replaced by repetitions of the second sequence, in which there is complete positive dependence. After this change the mean frequencies of $a$ and $b$ are unaltered, but that of the conjunction $ab$ is doubled. The weighted counts of $b$ and of $ab$, written $N(b)$ and $N(ab)$ are as in FIG. 6(b). The ratio $N(ab)/N(b)$ is the weighted conditional probability of $a$ given $b$, it is shown in the figure as a dotted line which tends to unity from its earlier value of one-half. The system no longer tends to a static state; new events can give rise to modified inferences (changed conditional probabilities).

Spontaneous Recovery

As can be seen from the full curve of FIG. 5(b), an exponential weighting function never alters the relative weighing of two past events A and B; there is the following consequence. Suppose that a series of recent events at inputs $a$ and $b$ determine $N(ab)$ and $N(b)$ in the appropriate counters and hence the conditional probability $N(ab)/N(b)$. If there is an interval $kT$ with not events, the weighting of every past event will be divided by $l^k$; so $N(ab)$ and $N(b)$ will be divided by $l^k$ and the conditional probability will be un changed in value. The phenomenon of spontaneous recovery implies a rise in conditional probability after no events, and this cannot occur if there is an exponential weighting function. Spontaneous recovery will occur only if recent events are given enhanced weight in comparison with earlier ones, that is, if the weighting function departs from an exponential form for recent events, as does the broken curve 115 of FIG. 5. Formally, if $W(t)$ is the weighting function, $$\frac{1}{W} \cdot \frac{dW}{dt}$$

must increase as $t$ increases. Spontaneous recovery can be demonstrated practically.

A Background of Random Activity

There is another consequence of introducing the weighting function. If there are no events at all weighted counts $N(ab)$ and $N(b)$ tend to zero so that $p(a/b)$ becomes indeterminate. In a practical computer with counting on an approximately logarithmic scale the situation is even worse. The scaled counts of $(ab)$ and $(b)$ should tend to infinity; in practice they cannot exceed a limiting value so they become equal; this causes $p(a/b)$ to tend to unity, an entirely incorrect result. It is possible to prevent $p(a/b)$ becoming either indeterminate or unity in the absence of events, and to arrange instead that $a$ and $b$ tend to become statistically independent; the occurrence of $b$ will not then affect the probability of $a$. This is achieved by presenting at the input of the computer quite spurious signals which are statistically independent; in the absence of real events each input then becomes active in a random manner which is independent of that of other inputs. If the mean random activation rate is low compared with that of the occurrence of real events it has practically no effect on conditioning rates.

The arbitrarily introduced random background is essential to the functioning of a practical computer; because of it conditional probabilities tend to an arbitrary value in the absence of real events and the effects fade of either positive conditioning (high conditional probability) or negative conditioning (low conditional probability).

THE DESIGN OF CONDITIONAL PROBABILITY SYSTEMS

Rules will now be deduced for the design of a conditional probability system. It will be shown that there must be interconnections between units additional to those of a classification system; the function of these connections is quite definite and there are definite rules of priority of control when a unit is affected by more than one other unit. The design is simplified if the specification is relaxed so that the system does not compute the value of conditional probabilities but only indicates, in a binary manner, whether they exceed an arbitrary level described as conditional certainty. Finally the elements of a conditional certainty computer in electron form will be described.

In a conditional probability system:

(a) There must be units connected to all possible sets of inputs.

(b) A unit must count if the corresponding set of inputs is active. (For this reason the connections referred to in (a) will be called counting connections. For convenience of design each unit will store the count on a logarithmic scale.)

(c) A weighting function may be introduced so that past events count less than more recent ones.

(d) If the set of inputs B become active, then associated with the set of inputs A the quantity $p(A/B)$ must be computed.

We have $p(A/B)=p(AUB)/p(B)$, where (AUB) is the union (the set of all members of either set) of sets A and B: but it has been pointed out that a conditional probability can be computed most easily if probabilities are stored on a logarithmic scale; then by subtraction $$\log p(A/B) = \log p(AUB) - \log p(B)$$

The negative logarithm of a probability arises frequently in the discussion so it will be called a rarity. A rarity, like a probability may be either unconditional or conditional. The symbol R will be used to represent the quantity $-\log p$: so $$R(A/B) = R(AUB) - R(B)$$

Suppose that the set B is active on $v$ occasions and that on $u$ of these the set A is active also. Then, if events are given constant weight:

$$R(A/B) = (-\log u) - (-\log v)$$

But it is not correct to identify $R(B)$ and $-\log v$, that is $p(B)$ and $v$, because no ensemble has been defined in terms of which $p(B)$ can be measured nor has a base been stated for the logarithm.

However, if a weighting function $W(t)$ is introduced such that $$\int_{-\infty}^{0} W(t)\,dt$$

has a limit, then an ensemble is defined and $v$ the weighted count of B is the weighted unnormalised probability of B. In these circumstances $$p(B) = v/v_0$$

where $v_0$ is a normalising factor and $$R(B) = \log(v/v_0)$$

Weighted Counters

A counter is fully described by its weighting function and the scale upon which it operates. Consider a series of events such that their rate at time $t$ is $n$; then their unweighted count for the last $t_0$ seconds is $$\int_{-t0}^{0} n.dt$$

and their weighted count is $$\int_{-t0}^{0} nW\,dt$$

As $t_0$ tends to infinity the unweighted count may also tend to infinity; but, from the above criterion for $W$ and if $n$ remains finite the weighted count will tend to a finite quantity, $$\int_{-\infty}^{0} nW\,dt$$

If the actual output of the counter is $f$ $$\left\{ \int_{-\infty}^{0} nW(t)\,dt \right\}$$

the function $f$ defines the scale of the counter.

If $n$, the rate of events, is held constant and $$\int_{-\infty}^{0} W\,dt$$

is written as $T$ the weighted count is $nT$, the number of events in the last $T$ seconds; the weighted count may therefore be regarded as an average rate of occurrence of events relative to a datum rate. The output of the counter will be $f(nT)$; if the function $f$ is a negative logarithm the output of the counter, now called the rarity, is the mean interval between events measured logarithmically.

Consider now the circuit of FIG. $7(a)$. The act of counting consists of moving the switch 116 to the right and then returning it to the left; in so doing a fraction $$\frac{C'}{C+C'}$$

of the charge in the condenser $C$ is removed. The resistance $R$ is taken to a fixed voltage $E_0$ and the voltage $E$ measures the rarity of past events.

If events occur at a uniform rate $n$ then in the steady state there is no net current in $C$ and the current in $R$ is equal to that flowing to earth through the intermediary $C'$. So $$\frac{E_0 - E}{R} = nC'E$$

and $$E = E_0/(1 + nC'R)$$

If the left hand contact of the switch is taken to a voltage $-kE_0$ $$E = E_0(1 - knC'R)/(1 + nC'R)$$

Ideally $$E = E_0 \log nC'R$$

but the hyperbolic approximation to a logarithm can be kept within a few percent for variations in $n$ of 100:1. It can be shown that the weighting function then takes the form $$W = K \exp (t/CR)$$

For small values of $n$, $K \sim C'/C$, but as $n$ increases $K$ decreases—the counter saturates.

An actual record of the rarity computed in such a counter is shown in FIG. $8a$; from A to B an event occurs every 8 seconds, from B to C there are no events; from C to D there is an event every 32 seconds. FIG. $8b$ shows an actual record of the rarities in the $b$ and $ab$ units of a Conditional Probability Computer; the third curve shows $R(ab) - R(b)$ on an enlarged scale. Before the instant T, $a$ and $b$ have been occurring independently at mean intervals of 8 and 16 seconds respectively; then on they occur jointly every 4 seconds and the rarities in the $a$, $b$ and $ab$ units tend to the same value. After the instant T′ no events occur; the rarities in all the units now increase in the same way. Nevertheless $$R(ab) - R(b)$$

which is $R(a/b)$, remains low; accordingly the fact that $b$ implies $a$ is not forgotten. This is an experiment in positive conditioning the conditional rarity of $a$ given $b$ is the difference in height of the $ab$ and $b$ curves; with an initial value of unity (a conditional probability of ½) the conditional rarity tends to zero (certainty).

A counter which will introduce spontaneous recovery in a conditional probability system must possess a weighting function of the form of the broken curve 115 of FIG. $5b$; an example of this is the sum of two exponential functions of different time constants. The circuit of FIG. $7b$ possesses such a weighting function and its properties have been tested in the actual computer; it is necessary that $C''R'' \gg CR$. Short term storage takes place in the condenser $C$ and long term storage in $C''$. For all such counters the weighting function is approximately the impulse response of the circuit to a single operation of the switch and condenser $C'$.

Similar properties have been demonstrated with the counter shown in FIG. $7c$ where B is a secondary battery; short term storage takes place in the surface layers of the electrodes; long term storage takes place in deeper layers. The equivalent circuit of FIG. $7c$ is that of FIG. $7d$ with distributed capacity $C, C'', C''', C'v, \ldots$ The features of these counters can be summarised:

(a) In the absence of events some quantity must grow in an approximately exponential manner, (b) The act of counting consists in the destruction of some of this quantity, preferably a fairly constant fraction of its present value, (c) For spontaneous recovery there must be storage in depth.

The Computation of Conditional Rarities

In the following argument, if the set of inputs A includes the set of inputs B (formally, if $A > B$) the A unit will be called a superunit of the B unit and the B unit will be called a subunit of unit A.

It can be shown that if $$A > B$$

then $$p(A) \leq p(B)$$

It follows that $$R(A) \geq R(B)$$

that is the rarity stored in a unit cannot exceed that stored in a superunit; this fact will be used frequently.

The final requirement of a conditional probability system is that if the set of inputs B becomes active the quantity $R(A/B)$ must be associated with the A unit; note that this quantity is quite different from $R(A)$ which has been computed and stored in the A unit.

Consider the problem which will arise if the conditional probabilities are computed of single inputs only; this problem will be considered first. Let $a$ be a single input and B a set of occurring inputs; then $$R(a/B) = R(a\mathrm{U}B) - R(B)$$

Note the $(a\mathrm{U}B)$ is a set containing one more input than B. The quantities on the right hand side of this equation exist in the corresponding units of the system, so there must be a comparison and hence a connection between these units. The quantity $R(a/B)$ will be formed in the system if, when B occurs, the content of the B unit is subtracted momentarily from that of the $(a\mathrm{U}B)$ unit; this effect of a unit on a superunit will be called super-control; it will be defined as follows:

(a) A unit exerts supercontrol only when the corresponding set of inputs actually occur.

(b) Supercontrol by a unit affects only those superunits which refer to one more input.

(c) By supercontrol the content of a unit is subtracted from that of a superunit.

The quantity to be associated with the $a$ unit has now been computed but it exits in the ($a$UB) unit; it is therefore necessary that the modified content of the ($a$UB) unit be transferred momentarily to the $a$ unit; this effect of a unit on a subunit will be called subcontrol.

Figure 9A:
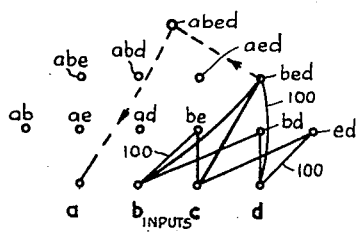
FIG. 9 shows connection schemes for conditional probability computers.

Some of the connections for counting supercontrol and subcontrol are shown in FIG. 9a for a system of four inputs ($a$, $b$, $c$, $d$). The conventions are similar to those of a Hasse diagram; a dot ($a$, $b$ . . . $d$, $ab$, . . ) represents a unit; if two dots, for example $b$ and $bc$, are joined by a line 100 the upper dot $bc$ represents a superunit of the lower dot $b$. It is assumed that the set of inputs B (i.e. $b$, $c$ and $d$) are active and the diagram includes only those connections which are used in these circumstances.

It is possible to vary the design of the system in a number of ways, but it is useful to discover a set of rules which will apply as far as possible, to all the units of the system. Two restrictions will be noticed in the above design; supercontrol is not to all superunits but only to those referring to one more input; subcontrol is only to the lowest level of the system. The former restriction will be discussed later; the latter can be eased now though at some expense—universality is bought with added complexity.

Note that $R(a/B)$ is not only the conditional rarity of $a$ given B; but it is also the conditional rarity of any set contained in ($a$UB) and containing $a$. It will not therefore be incorrect to allow subcontrol by the ($a$UB) unit 118 of all such subunits by connection 117, as in FIG. 9b. The effect of these additional connections 117 is to compute correctly the conditional rarities of sets other than those of the lowest level.

Subcontrol by the ($a$UB) unit 118 is still restricted to those subunits which contain $a$; the definition of subcontrol will therefore be extended to refer to all subunits. There is now conflict between counting control and subcontrol, this is shown for the $bd$ unit in FIG. 9c; the system will compute the conditional rarity of sets of inputs which are actually occurring. No great harm is done by this. As has been stated in the first section, there are two ways in which certainty can be represented in a conditional probability system, by actual occurrence or by inference. It can be laid down as a design rule that counting control overrules subcontrol if there is some objection to a system inferring non-occurrence of something actually occurring.

Figure 9B:
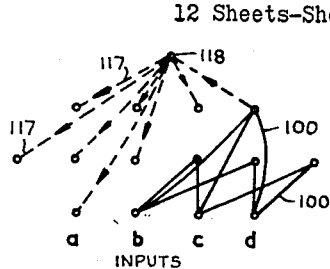
Figure 9C:
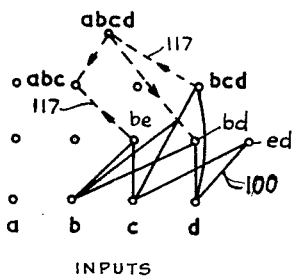

Of much more importance, there can be conflict between supercontrol and subcontrol; by definition each unit which counts exerts supercontrol; for example, there will be supercontrol of the ($abc$) unit by the ($bc$) unit, this is shown in FIG. 9c. The ($abc$) unit will then contain the quantity $R(abc)-R(bc)$ this is incorrect supercontrol; the ($abc$) unit should be subcontrolled to contain the quantity $R(abcd)-R(bcd)$. The conflict can be prevented in at least two different ways. Firstly it can be laid down that there shall be supercontrol only from a level at which only one unit counts. Alternatively, and more naturally, it can be laid down that subcontrol overrules incorrect supercontrol.

A further variation of design is possible; the conditional rarities of all subsets of ($a$UB) will be computed correctly if: subcontrol is to only one level lower (for sets containing one less input); and subcontrol evokes subcontrol.

Figure 9D:
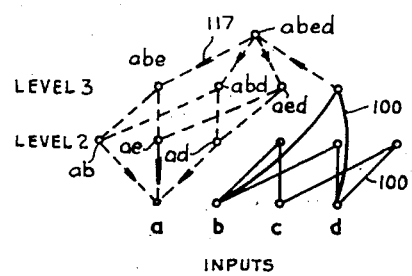

Such a design is shown in FIG. 9d. Note that there is multiple subcontrol at levels 2 and 3 but this introduces no conflict since the same quantity $R(a/B)$ is transferred by the different routes.

Subcontrol will also occur correctly if: subcontrol is to all subunits and subcontrol evokes subcontrol.

All that matters in these variants of subcontrol flow is that somehow the correct quantity shall arrive at the lowest level.

To summarise, subcontrol is defined as follows:
(a) A unit exerts subcontrol if it is supercontrolled.
(b) Subcontrol is either ($i$) to all subunits, in which case subcontrol may evoke subcontrol, or ($ii$) to subunits referring to one less input in which case subcontrol must evoke subcontrol.
(c) By subcontrol the content of a unit is transferred to the subunit.
(d) Subcontrol overrules incorrect supercontrol.

Figure 9E:
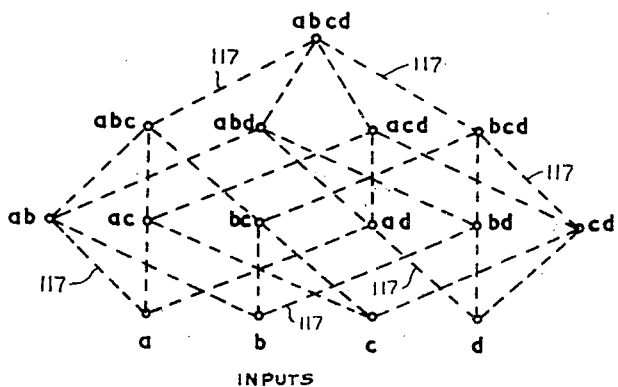
Figure 9F:
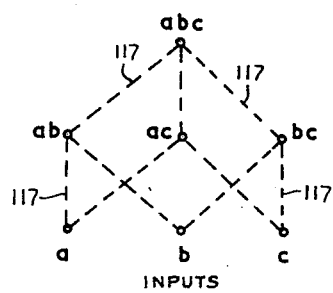

FIGS. 9b and 9d show the subcontrol connections 117 from the ($abcd$) unit to the $a$ unit only. It can be seen that the system of FIG. 9a already provides the subcontrol connections 117 for the $abc$, $acd$, $abd$, $ab$, $ac$ and $ad$ units; therefore it is much more economical than the system of FIG. 9b. There must be similar connections from all units to all subunits; all the subcontrol connections 117 for 4 and 3 input systems are shown by the broken lines of FIGS. 9e and 9f; they also represent the scheme of connections required for supercontrol though this operates in the reverse direction with a different function. FIG. 9f may be compared with FIG. 1 which shows the corresponding counting connections 100.

A large number of properties have now been assigned to the unit; it must be affected by counting, supercontrol and subcontrol; it must effect supercontrol and subcontrol. A theoretical design for such a unit in electronic form is shown in FIG. 10a. Counting is effected by operating the relay 119 which controls the switch 120; the stored rarity is represented by the voltage at the point 121; by means of an isolating cathode follower valve 122 this quantity is preserved from disturbance by supercontrol.

If FIG. 10($a$) refers to the B unit which is counting, the switch 123 provides a voltage proportional to R(B) at the point Super Out. This voltage is taken by a supercontrol connection to the point Super In of the ($a$UB) unit; (there must be conventional isolating diodes in the one-way supercontrol connections). The voltmeter 124 of the ($a$UB) unit then reads $R(aUB)-R(B)$ the conditional rarity of $a$; this floating voltage is taken to the points Sub Out, whence it is conveyed by subcontrol connections either directly or via intermediate subunits to the $a$ unit. Contacts T1 and T2 in all subcontrolled units must operate, this ensures that subcontrol overrules supercontrol.

The contacts T1 and T2 are a schematic representation of switching which must be associated with subcontrolled units to ensure that subcontrol does in fact overrule supercontrol. The precise nature of the switching is dependent upon the configuration of the subcontrol and supercontrol connections in a given system and is controled according to the activation of the different units in their levels in the system. This will be seen more clearly from the example given later in this specification. A typical example, which includes the necessary switching, is described later as a part of a detailed study of a conditional probability computer used in a control system possessing judgment.

Circuit waveforms are shown in FIG. 10b. It is assumed that only B is occurring. The first waveform is that at the point 121 in the B unit; this voltage is a measure of R(B) which is decreasing due to occurrence and counting of B. The second waveform is that at the voltmeter 124 in the ($a$UB) unit; this voltage is a measure of $R(a/B)$. Since this unit is not counting there is no drift downwards in general level; and since this unit is supercontrolled there is only a reduction in rarity; R(B), the quantity subtracted, is itself decreasing. The third waveform is that at the voltmeter 124 in the $a$ unit; without control this voltage represents R($a$), but subcontrol changes it to $R(a/B)$ which may either be greater or less than R($a$). It will be noted that the conditional rarity $R(a/B)$ is measured at the voltmeter 124 of the $a$ unit and it is not confused with the point 121(a) which exists at E in the unit, although the two quantities are the same in the absence of supercontrol or subcontrol. Two different states of the $a$ unit represent certainty of $a$. Either the counting relay 119 operates by actual occurrence, as in a classification system, or the voltmeter 124 reads zero and there is certainty by inference.

General Supercontrol

Now consider the extension of the system to compute the conditional rarity, not only of single inputs, but of all sets of inputs. For a set of inputs A $$R(A/B) = R(AUB) - R(B)$$

so it is necessary to subtract the rarity of B from that of a superset which contains more than one additional element. To allow for all possible conditions it is necessary to extend the definition of supercontrol as follows: general supercontrol by a unit affects all its superunits, supercontrol may evoke supercontrol.

As with general subcontrol, general supercontrol is bought with some further complexity of unit design because of the conflict of control which arises. It will be remembered that, in the simpler system, if supercontrol is permitted from all counting units there will be incorrect supercontrol which must be overruled by subcontrol. This incorrect supercontrol should never arise from a mathematical point of view, it comes about only through over-generalisation of the definition of supercontrol. Suppose, to begin with, that incorrect supercontrol does not exist. Then FIG. 11 shows the situation that will arise if $(abc)$ occurs in a five input system; all units are shown which are relevant to the discussion. There is general supercontrol from the $(abc)$ unit to the $(abcd)$ and $(abcde)$ units from which general subcontrol descends. These is now conflict of control at two points. Firstly there are supercontrol and subcontrol of the $(abcd)$ unit. Supercontrol is correct since it forms the quantity $R(abcd) - R(abc)$; the quantity computed by subcontrol is $R(abcde) - R(abc)$. Now $(abcde) > (abcd)$, therefore $R(abcde) \geqslant R(abcd)$; so in this case subcontrol cannot compute a smaller quantity than supercontrol. The conflict can therefore be resolved in at least two ways. It can be laid down that when there is a conflict of correct supercontrol and subcontrol either (a) the smaller conditional rarity is correct and should be adopted, or (b) supercontrol shall overrule subcontrol.

The second point of conflict occurs at the $(bcd)$ unit where there is multiple subcontrol; if it is assumed that control of the $(abcd)$ unit has been resolved as above, this unit will subcontrol the $(bcd)$ unit to demand $$R(abcd) - R(abc)$$

subcontrol from the $(abcde)$ unit demands $$R(abcde) - R(abc)$$

The former quantity is the correct conditional rarity of $bcd$; it is also the smaller quantity. It can therefore be laid down that when there is multiple subcontrol that which demands minimal rarity shall be effective.

Finally, if incorrect supercontrol is permitted there is further conflict of control at the $(abcde)$ and $(bcd)$ units. Incorrect supercontrol of the $(abcde)$ unit by the $(bc)$ unit demands $R(abcde) - R(bc)$; this quantity is greater or equal to the correct quantity $R(abcde) - R(abc)$ which is demanded by supercontrol from the $(abc)$ unit. Once again, the conflict is resolved by the rule that when there is multiple supercontrol that which demands minimal rarity shall be effective.

At the $(bcd)$ unit multiple subcontrol has been resolved above to demand $R(abcd) - R(abc)$; but incorrect supercontrol by the $bc$ unit demands $R(bcd) - R(bc)$, the latter quantity may be either greater or less than the correct quantity. The conflict can be resolved only as for the simpler system: subcontrol overrules incorrect supercontrol.

It can be seen that neither rule (a) or (b) above meets this requirement; it is essential therefore to distinguish correct and incorrect supercontrol and to lay down different rules concerning them.

The additonal laws for supercontrol and subcontrol for the extended conditional probability system will be summarised:

(a) When there is multiple supercontrol of a unit, that which demands minimal rarity shall be effective.

(b) When there is multiple subcontrol of a unit, that which demands minimal rarity shall be effective.

(c) Correct supercontrol overrules subcontrol.

(d) Subcontrol overrules incorrect supercontrol.

Conditional Certainty Systems

A considerable difficulty arises in the design of a practical conditional probability system. As can be seen from FIG. 10a, subcontrol involves the transfer of the (floating) voltage between two points which are themselves varying in voltage above a datum point (earth) in the circuit. Suppose that the specification is eased so that the system does not compute the conditional probability of an input, but only indicates if it exceeds a chosen value; if so, the input will be said to be conditionally certain. For the input $a$, if the set B occurs it is the new function of supercontrol to compare the quantities $R(B)$ and $R(aUB)$ which are stored in the corresponding units; if $R(aUB)$ exceeds $R(B)$ by less than a threshold value, the $(aUB)$ unit must be changed to a state of conditional certainty. It follows that all the subsets of $(aUB)$ are certain, so subcontrol consists of a kind of avalanche of certainty descending through subunits to the $a$ unit at the bottom level of the system; mathematically this is no more than the transfer of binary digits (representing certainty/uncertainty); technically this is much easier than the transfer of variable voltages; such a system will be called a conditional certainty system; the output is binary, like that of a classification system, so if it is to control variable quantities a suitable system must be interposed.

There are further simplifications of design. If $p(a)$ and $p(b)$ exceed a value $k$, $p(ab)$ must lie between $k$ and $2k-1$; therefore if $k$ is close to unity so is $p(ab)$; in other words if $a$ and $b$ are conditionally certain so is the conjunction $ab$; there is therefore nothing to be gained from computing the conditional rarity of the set $ab$, and general supercontrol is unnecessary. Finally, because the function of supercontrol is to determine whether two counters are at approximately the same level of rarity the scale upon which they operate is immaterial. The remaining usefulness of an approximately logarithmic scale is that it compresses range in the stored quantity. Suppose, for example, that rarity to base 10 were to be stored on a scale of 10 millivolts per unit. Then an average rarity of one event per second being represented by 10 mv., once per hundred seconds would be represented by 30 mv., once per hour by 45 mv., once per day by 59 mv., and once per year by 85 mv.; if the system saturated at 100 mv. events separated by more than 3½ years would have no effect. A similar system with a linear scale would saturate at 10 events per second.

Summary of Design

As in a classification system, there must be units (111) connected to inputs $(a,b,c)$ in all possible ways (as in FIG. 4); these connections (100) are called counting connections. But each unit, in addition to indicating if the corresponding set of inputs is active, must count $u$ the number of times this conjunction occurs and store $u_0/u$ (where $u_0$ is a constant) on an approximately logarithmic scale; the quantity $u_0/u$ is called the rarity of the conjunction.

The negative logarithm of a conditional probability, called a conditional rarity, is the difference between two rarities; so all computation in a conditional probability system consists solely in determining the differences between rarities stored in units.

So that new events can modify rarities the counting unit must weight past events less than recent ones; if events occur at a constant rate the weighted rarity stored in the counter settles at a level proportional to the logarithm of the interval between the events. For example, if rarity were represented in millivolts the following scale might apply.

| Mean interval between events: | Voltage, mv. |
|---|---|
| 1 second | 10 |
| 10 seconds | 20 |
| 100 seconds | 30 |
| 1 hour | 45 |
| 1 day | 59 |
| 1 year | 85 |

Spontaneous recovery cannot occur if the weighting function is exponential; instead it must take the form of the dotted curve of FIG. 6a. Such a weighting function arises if storage occurs in depth, recent events affecting only surface layers.

It can be shown that to compute weighted rarities a unit must have the following properties:

(1) In the absence of events some quantity must grow in an approximately exponential manner.
(2) The act of counting consists in the destruction of some of this quantity preferably a fairly constant fraction of its present values.
(3) For spontaneous recovery there must be storage in depth.

So that rarities in different units may be compared there must be connections additional to those for counting. Consider two sets of inputs; the first containing the second; the unit distinguishing the first set is called a superunit of the unit distinguishing the second; conversely the latter is called a subunit of the former. The new connections required are only between units and superunits, with different functions in the two directions; these connections 117 are shown in FIGS. 9f and 9e for 3 and 4 input systems respectively.

The effect of a unit on a superunit is called supercontrol; this is defined as follows:

(4) A unit exerts supercontrol only when the corresponding set of inputs actually occurs. If a superset also occurs the supercontrol is incorrect.
(5) Supercontrol by a unit affects only those superunits which refer to one more input.
(6) By supercontrol the content of a unit is subtracted from that of a superunit.

It has been shown that the rarity stored in a unit cannot exceed that stored in a superunit; it follows that supercontrol can never give rise to negative quantities.

The converse effect of a unit on a subunit is called subcontrol;

(7) A unit exerts subcontrol if it is supercontrolled.
(8) Subcontrol is either—
(i) To all subunits in which case subcontrol may evoke subcontrol, or
(ii) to subunits referring to one less input, in which case subcontrol must evoke subcontrol.
(9) By subcontrol the content of a unit is transferred to the subunit.
(10) Subcontrol overrules incorrect supercontrol.

If the system is to compute the conditional probability, not only of single inputs but of all possible sets of inputs, rule 5 is extended as follows: General supercontrol by a unit affects all its superunits; general supercontrol may evoke general supercontrol.

In this extended system there are further conflicts of control for which there are three further rules of priority.

(11) If there is multiple supercontrol of a unit, that which demands minimal rarity shall be effective.
(12) If there is multiple subcontrol of a unit, that which demands minimal rarity shall be effective.
(13) Correct supercontrol overrules subcontrol.

The problem of design is eased if the system does not compute the conditional probability of an input, but merely indicates if it exceeds a threshold value, if so the input is said to be conditionally certain. Rules 6, 9 and 11 are then modified as follows:

(6a) By supercontrol the content of a unit is subtracted from that of a super-unit; if the difference is less than a threshold value the superunit is changed to a state of conditional certainty. General supercontrol is unnecessary.
(9a) By subcontrol a unit in a state of conditional certainty changes subunits to the same state.
(11a) If there is multiple supercontrol that which demands certainty shall be effective.

Subcontrol always demands certainty so rule 12 does not arise.

If supercontrol is defined by rule 5, rules 11a and 13 do not apply.

The only rules which create a difficult problem of design are numbers (10) and (13) and they have not been eased in turning from conditional probability systems. They arise entirely from the existence of general supercontrol to all superunits and incorrect supercontrol from subsets of the total set occurring. If the former is eliminated so is rule 13 and if the latter is eliminated rule 10 is avoided. For either of these two design solutions there is a fixed set of priorities of control.

The final choice is as follows:

*Solution 1. General supercontrol and incorrect supercontrol.*—There is general supercontrol from all counting units. Rules 10, 11, 12, and 13 apply. The discrimination of correct and incorrect supercontrol is essential; this is possible theoretically since incorrect supercontrol always subtracts a smaller quantity then correct supercontrol.

*Solution 2. General supercontrol but no incorrect supercontrol.*—If the set J is occurring there is supercontrol only from the corresponding unit but to all higher levels. Rules 11, 12 and 13 apply.

*Solution 3. Limited supercontrol and incorrect supercontrol.*—If the set J is occurring there is subcontrol from all subunits of J since they also are counting but in all cases supercontrol is to only one level higher. Rule 10 applies.

*Solution 4. Limited supercontrol and no incorrect supercontrol.*—There is supercontrol from only the total occurring set to only one level higher; none of the rules 10 to 13 are required.

It will be seen that the solutions form a series; at one end there is complete generality of supercontrol and subcontrol connections, and four laws to decide which is correct; at the other end it is arbitrarily stated that those controls which are incorrect shall not be permitted to arise. The design problem is not really eased thereby, it is solved in a different way.

*A Practical Conditional Probability Computer*

An electronic design for the unit of a conditional probability system of the kind where an indication is given if the computed probability exceeds a predetermined value is shown in FIG. 12a; there is one unit for every set of inputs.

Figure 7A:
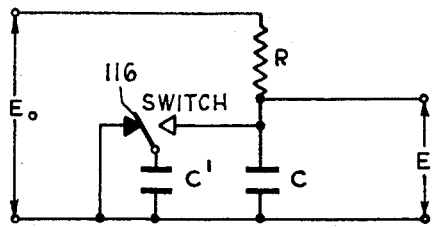
FIG. 7 shows counter circuits for a conditional probability computer.
Figure 7B:
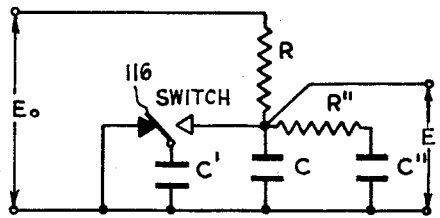
Figure 7C:
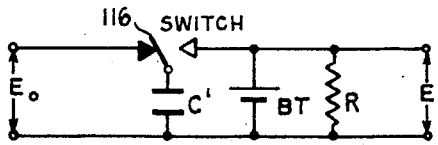
Figure 7D:
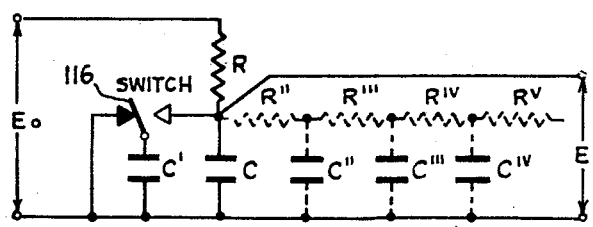
Figure 8A:
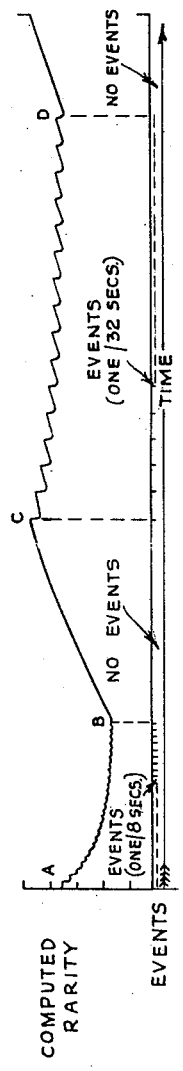
FIG. 8 shows certain graphs relating to the counters of FIG. 7.
Figure 8B:
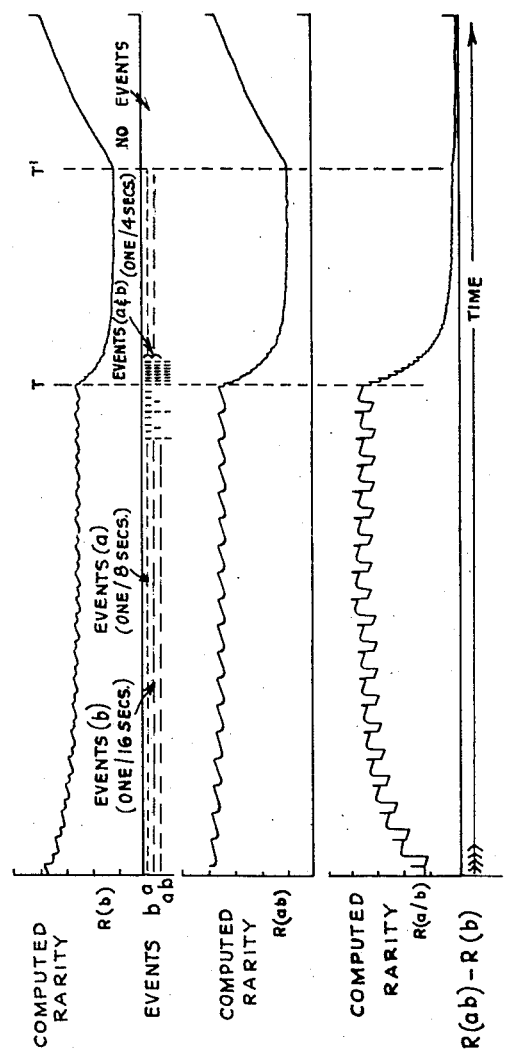

There are two parts to the circuit, a counter for computing rarity and a trigger circuit for detecting whether conditional rarity is less than the critical value which defines certainty. The resistance $R_2$ and the condensers $C_1$ and $C_2$ form the counting circuit of FIG. 7a; the voltage across $C_2$ controls the cathode follower $V_1$ whose cathode voltage $V_R$ is a measure of the rarity of the set of inputs. In the absence of counting this voltage rises exponentially to +70 v., with a time constant of about four minutes; in the act of counting relay A, normally operated, releases momentarily and a fixed fraction of the charge in $C_2$ is removed by $C_1$ when the contact $A_1$ moves; $V_R$ is reduced accordingly. When the relay A releases to represent the state of certainty the rarity voltage $V_R$ is fed via contacts $A_2$ to the output point of the circuit. From here it passes via isolating diodes, not shown in the diagram, to the supercontrol input points of superunits, and to the subcontrol input points of subunits to be compared with their rarity voltages; if any one of these voltages exceeds $V_R$ by less than the threshold amount the corresponding unit is triggered into the state of certainty.

Conversely, the rarity voltages of other units appear at the input points of this unit to determine, in the following way, whether it should be in a state of certainty. First assume that the resistance $R_5$ is zero; the full value of the rarity of the unit is then applied across condenser $C_3$ whose right hand point is earthed via $D_3$ and $R_6$. Now consider the function of supercontrol, with the contacts $M_1$ in the position drawn. If the $A_2$ contacts of some subunit move from right to left indicating a change from uncertainty to certainty, the rarity voltage of the subunit is applied, in this unit, to the junction between $D_2$ and $C_3$. If the applied voltage exceeds that of this unit there is a positive pulse at the grid of $V_{2a}$; this triggers the monostable circuit containing valves $V_{2a}$ and $V_{2b}$ so that the relay A, normally operated, releases to represent certainty. Because the amplitude of the applied pulse depends on the excess rarity, the time of release of the relay can vary; to prevent this, contacts $A_3$ apply a standard negative pulse to the cathode of $V_{2a}$.

To introduce the threshold effect, a battery could be inserted between the cathode of $V_1$ and the diode $D_2$; the battery voltage should be fixed only if $V_R$ were strictly proportional to the logarithm of the mean interval between events; this is not so in the present circuit and the threshold effect has been obtained approximately by inserting the fixed resistor $R_5$. In consequence, the conditional probability which defines certainty depends to some extent on the mean interval between events.

If the priority contacts $M_1$ are operated the unit can be subcontrolled; the rarity voltage of some superunit can then be compared with $V_R$; it cannot be less than $V_R$ so subcontrol will always determine certainly.

Counting, due to actual occurrence, is distinguished from conditional certainty in the following way. The counting connections from inputs to the "count-in" points of units are as in FIG. 12b where isolating diodes 128 are connected in the counting connections 129. The contacts 125, 126, 127, etc. are made for non-occurrence and broken for occurrence; if FIG. 12a refers, say, to the abc unit, the "count-in" point will drop from +70 v. to earth only if the contacts 125, 126, 127 are all broken. A negative going pulse will then be applied via $D_4$ to the grid $V_{2b}$ to trigger the certainty circuit. But there is a second consequence, if the "count-in" point had been at +70 v. the condenser $C_1$ would not have been discharged through $D_1$ and the voltage $V_R$ would not have been reduced. Modification of the rarity voltage $V_R$ can occur only if the "count-in" point is earthed, that is, if the contacts 125, 126, 127 are broken. The representation of the unit is therefore as follows:

| State | Relay A | Voltage at count-in |
| --- | --- | --- |
| Uncertainty | Operated | 70 |
| Conditional certainty | Released | 70 |
| Occurrence | do | 0 |

The contacts $M_1$ are controlled according to solution 4 given above. If $n$ inputs become active, then at level $(n+1)$ all M contacts are in the supercontrol position; they are in the subcontrol position at all other levels. The precise functioning of the contacts is dependent upon the configuration of the subcontrol and supercontrol connection in a given conditional probability system. A detailed example will be given later.

Inter-connections 130 and 131 for a two input (contacts 133 and 134) machine with the necessary isolating diodes 132 are shown in FIG. 12c. Those skilled in the art will be able to formulate suitable connections for machines having more than two inputs and in the interests of simplicity the details and complicated connection circuits will not be referred to at this stage.

An example of an automatic control system for a motor-driven pointer will now be described in which a measure of "judgment" is provided by the combination of a conditional probability computer with the elements of a servo-control system.

In FIG. 13 a motor 1 is controlled by controlling circuits 2 and 3 which serve, when actuated, to control the motor 1 to drive, in a clockwise direction or in an anti-clockwise direction respectively. The motor 1 drives a pointer 4 by means of its shaft 5; the pointer 4 makes contact with positive error and negative error segments 6 and 7 which indicate when the pointer 4 departs from its desired datum position 8 and in what sense the departure has occurred. An indicator 9 is driven from the shaft 5 and is arranged to indicate whether the error indicated by the pointer 4 is decreasing. Conveniently the indicator 9 consists of a generator whose armature is wound on the shaft 5 and whose field coil is earthed at one end and connected, by means of a further pointer fixed on the shaft and making contact with fixed positive and negative segments corresponding to the error segments 6 and 7, to either a positive or negative current source according to the angular position of the pointer 4. A rectifier is connected in series with the armature of the generator and thus during movement of the shaft 5 provides a signal which indicates whether the error is decreasing—the field coil is energised in direction according to the sign of the error and the armature E.M.F. can only appear through the rectifier when the error is decreasing.

A conditional probability computer 10 has 5 binary inputs at input units 11, 12, 13, 14, and 15. For simplicity further units of the computer are not shown at this stage. Connections between the computer 10 and the other parts of the circuit are made as follows:

Inputs to the Computer

*Input 1.*—A connection 16 from the controlling circuit 2 to the input unit 11 to feed into the computer 10 information as to the actuation or not of the circuit 2; this connection 16 is controlled by a relay contact CS1.

*Input 2.*—A connection 17 from the controlling circuit 3 to the input unit 15 to feed into the computer 10 information as to the actuation or not of the circuit 3; this connection 17 is controlled by a relay contact CS7.

*Inputs 3 and 4.*—Connections 18 and 19 controlled by relay contacts CS3 and CS5 from the error segments 6 and 7 to the input units 12 and 14, all respectively, to feed in information as to the sense of the error in the position of the pointer 4 relative to the datum position 8.

*Input 5.*—A connection 20, controlled by relay contact CS4, from the indicator 9 to the input unit 13, to feed in information that the error is decreasing when this is the effect of the motor in correcting the error of position of the pointer 4.

Outputs from the Computer

*Output 1.*—A connection 24 from the conditional probability output of the input unit 11 to the controlling circuit 2 to control the circuit 2 according to the computed conditional probability of its actuation.

*Output 2.*—A connection 25 from conditional probability output of the input unit 15 to the controlling circuit 3 to control the circuit 3 according to the computed conditional probability of its actuation.

These output connections are controled by relay contacts CS2 and CS6 respectively.

The relay CS is connected to a battery source and via a terminal 21 to an earthed pulse source having a recurrence frequency of one pulse each second.

Controlling circuits 2, 3 are connected via terminals 22, 23 respectively to random low-level pulse sources having a recurrence frequency of one pulse every 8 seconds.

An instruction switch 26 is connected so that the input connection 20 can be connected to battery when required.

In operation the relay CS operates continuously so that the input units 11, 12, 13, 14 and 15 of the computer 10 are fed with information in binary form (choice of two-states by the five inputs to the computer. The rate of operation of relay CS is chosen to ensure that the rate of feeding information does not exceed that which would overload the counters of the computer units.

The detailed operation of the control system can more easily be considered in conjunction with the following table:

The operation of the system is still random; on operation of either of the controlling circuits 2, or 3 the probabilities that the pointer 4 will move clockwise or anti-clockwise are equal—however, the system can be said to have learnt the consequences of its controlling actions in different circumstances; but it has not yet been instructed which of the consequences of its action is correct and which incorrect. Accordingly the probabilities that the pointer 4 will be controlled to move clockwise or anticlockwise on energisation of one controlling circuit are equal (part II (*a*) and (*b*) of table).

When an instruction is given, however, by operation of the switch 26 to indicate that the error should decrease, the system can achieve this. The computer 10 has already computed a high probability that with the pointer 4 on the segment 6 the consequence of actuation of the controlling circuit 2 is that the error will decrease; so, when the switch 26 is operated with the pointer 4 on the segment 6 an output appears in the output connection 24 of the unit 11 and no output in the output connection 25 of the unit 15, owing to the respectively high and low computed probabilities (part III(*a*) of table); in the event of an instruction being given to decrease the error where the pointer 4 is on the other segment 7 an output appears

TABLE

| Part | Clockwise control | | Error decrease | Anticlockwise control | | Remarks |
|---|---|---|---|---|---|---|
| | Input unit 11 | Pointer error, input unit 12 | Pointer towards datum position 8, unit 13 | Pointer error, input unit 15 | Input unit 15 | |
| I (a) | 1 | 1 | 1 | | | Learning phase. Clockwise and anticlockwise actuated randomly regardless of error. Consequences assessed. |
| (b) | | 1 | | | 1 | |
| (c) | | | 1 | 1 | 1 | |
| (d) | 1 | | | 1 | | |

COMPUTED PROBABILITY

| | Input unit 11 | Pointer error, input unit 12 | Pointer towards datum position 8, unit 13 | Pointer error, input unit 15 | Input unit 15 | Remarks |
|---|---|---|---|---|---|---|
| II (a) | (½) | 1 | | | (½) | Behaviour after learning; no instruction given. |
| (b) | (½) | | | 1 | (½) | |
| III (a) | (1) | 1 | 1 | | (0) | Behaviour after learning; instruction to decrease error given. |
| (b) | (0) | | 1 | 1 | (1) | |
| IV (a) | (0) | 1 | 1 | | (1) | Behaviour after learning; instruction given but control reversed. |
| (b) | (1) | | 1 | 1 | (0) | |
| (c) | (½) | 1 | 1 | | (½) | |
| (d) | (½) | | 1 | 1 | (½) | All probabilities tend to ½. |
| (e) | (½) | 1 | 1 | | (½) | |
| (f) | (½) | | 1 | 1 | (½) | |
| V (a) | 1 | 1 | | | | Relearning phase; when this is repeated enough times the past will be lost. |
| (b) | | 1 | 1 | | 1 | |
| (c) | | 1 | 1 | | | |
| (d) | | | 1 | | 1 | |
| VI (a) | (0) | 1 | 1 | | (1) | Behaviour after fully relearning; instruction given to decrease error. |
| (b) | (1) | 1 | 1 | | (0) | |

Each time the controlling circuit 2, or 3 is actuated, following the presence of a random input pulse on the terminal 22, or 23 respectively, the motor 1 drives for a short period in a direction dependent upon which controlling circuit 2, or 3 is actuated.

In these circumstances of random actuation the different input indications to the conditional probability computer 10 could be as shown in part I of the table. From the inputs it receives the computer 10 computes a high probability that, with the controlling circuit 2 energised when the pointer 4 is on the error segment 6, the consequence is that the error is decreased (part I(*a*) of table). Similarly for energisation of the controlling circuit 3 when the pointer 4 is on the error segment 7 a high probability, here certainty, is computed that the consequence is a decrease in the error (part I(*c*) of table).

In complementary fashion the probability of the consequence that the error will decrease for energisation of the controlling circuits 2, or 3, when the pointer 4 is on the error segments 7, or 6 respectively is computed to be small here zero (part I(*b*) and (*d*) of table).

in the output connection 25 of the unit 15 and none in the output connection 24. (The computed probabilities are given in part III(*b*) of table.) These outputs ensure that the object of the instruction is achieved—that the error should decrease.

Now, what happens if the control connections, for example to the motor, are reversed? In the ordinary way in a conventional servo-control system the error would increase when it should decrease and vice versa and no useful control would be achieved.

In the system under discussion the result is that, initially, the computed probabilities are still such that incorrect actuation of the control circuits 2 and 3 is caused by the outputs of the units 11 and 15 respectively. However, in the absence of instruction and with only the random input pulses effective to actuate the controlling circuits 2 and 3 the system eventually sets about the relearning of the consequences of its control actions.

It can be seen that the computed probabilities gradually change until they become equal (½). This operation, which can be described as "forgetting" that which has been learnt before and is only appropriate to the system before the motor connections were reversed, is shown by the table at IV(a) to (f).

When all the probabilities have been computed equal a relearning phase begins in which the system learns the new consequences which occur as a result of the reversal of the motor connections (parts V(a) to (d) of table).

The effect of the past learning is "forgotten" and the system has computed new probabilities appropriate to the new motor connections.

If now an instruction to decrease error is given the computed probabilities will be as shown in part VI(a) and (b) of table for the actuation of controlling circuits 2 and 3 respectively. By virtue of the computed probabilities appropriate outputs will appear at the units 15 and 11 according to the position of the pointer 4 and the movement of the pointer 4 when driven by the motor 1 will be such as to decrease the error. Thus correct behaviour has been achieved even though the motor now drives in a reverse direction to that in which it drove under the control of actuation of controlling circuits 2 and 3.

It is convenient at this stage to describe in more detail the internal connections of the computer 10 together with its units and control switching arrangements.

FIG. 15 shows the units which make up the conditional probability computer 10. The input units of the computer 10, designated in FIG. 13 as 11, 12, 13, 14, 15, are designated V, W, X, Y, Z respectively in FIG. 15 and are together known as the level A of the computer. A level B contains those units which correspond to all the different sets of two inputs, VW, VX, WX, WY, VY, WZ, XY, YZ, VZ, XZ; a level C contains those units corresponding to all the different sets of three inputs, VYZ, VWX, VYX, VZX, VWY, VWZ, XYZ, WYZ, YWX, ZWX; a level D contains those units corresponding to all the different sets of four inputs, VWXY, WXYZ, XYZV, VWXZ, ZVWY; and a level E contains the unit corresponding to the only possible set of five inputs, VWXYZ.

The connections at a typical unit are detailed for a typical level C unit (XYZ) and comprise:

C, a counting input, $S_1$, an input for receiving supercontrol from sets of units one level below that of the unit (in this case the level B), $S_0$, an output for passing supercontrol to sets of units one level above that of the unit (in this case the level D), $I_0$, an output for passing counts on to the outputs of the input units V, W, X, Y, Z, S, for receiving a signal controlling suppression of supercontrol on levels according to the number of inputs activated when an event (activation of inputs) occurs, and T, for receiving a signal inhibiting counting on a level predetermined according to the number of inputs activated when an event occurs.

To avoid unduly complicating the drawing not all the connections between units are shown; the connections will merely be detailed in the text and typical ones only shown on the drawing.

The inputs V, W, X, Y, Z are connected to the counting connections C of their corresponding input units by paths containing a rectifying element to ensure the one-way nature of each path to prevent interference between paths beginning or terminating at a common point; the paths input Y to unit Y and input Z to unit Z are typical. Additionally each input is connected to the counting connection C of those units of the different levels which are required to count whenever the input is activated. These connections are detailed in FIG. 15 for the input Z and are as follows:

From the input Z, (a) To all units in the level B which count with the input Z, WZ, YZ (drawn in), VZ, XZ, (b) To all units in the level C which count with the input Z, VYZ, VZX, VWZ, XYZ (drawn in), WYZ, ZWX, (c) To all units in the level D which count with the input Z, WXYZ, XYZV, VWXZ, ZVWY, (d) To the unit VWXYZ of the level E which counts with the input Z as it does with all the other inputs.

Consistently similar connections are provided for the other inputs V, W, X, Y.

The $S_0$ supercontrol connections of the units of the levels A, B, C, D are connected by individual rectifier paths to the $S_1$ supercontrol connections of the units of the next levels above, that is, of levels B, C, D and E respectively. Typical connections are indicated for the connection $S_0$ of the unit YZ, level B to the connection $S_1$ of the unit XYZ and others involving X on the level C; and also for the connection $S_0$ of the units of the level D to the connection $S_1$ of the unit VWXYZ, level E.

The $I_0$ subcontrol connections of a unit are connected by individual rectifier paths to the appropriate outputs of the Input units shown at the top of the figure. A typical connection is shown for the C level unit VWZ, to outputs V, W, X; also for the E level unit VWXYZ, to each of the outputs V, W, X, Y, Z.

The connections S and T of the units are connected to the level control switching circuit of FIG. 17.

In FIG. 17 relays VA, WA, XA, YA, ZA are connected to the inputs of the corresponding input units V, W, X, Y, Z respectively of FIG. 15. The contacts VA1, WA1 and 2, XA1 to 3, YA1 to 4 and ZA1 to 5 form the relay contact tree shown above the relays to control level relays LA, LB, LC, LD and LE. Rectifiers MR connect between level relays LE and LD, LD and LC, and LC and LB.

Thus, when one of the inputs V, W, X, Y, Z is activated the relay LA operates, when two of the inputs are activated the relay LB operates, when three are activated the relays LB and LC operate, when four are activated the relays LB, LC and LD operate, and when all five are activated the relays LB, LC, LD and LE operate.

The contacts of the relays LA, LB, LC, LD and LE, with the contacts of subsidiary relays SD, TD, SC, TC, SB, TB provide outputs for connection to the S and T connections of the units of FIG. 15.

The outputs connected to the connections S of the units (FIG. 15) ensure that when more than one input is activated supercontrol is suppressed for those units on levels above the A level and up to and including a level corresponding to the number of inputs activated; thus when three inputs are activated supercontrol is suppressed for the units of the levels B and C, for four inputs activated suppression is applied to the units of the levels B, C and D.

The outputs connected to the connections T of the units (FIG. 15) ensure that counting is inhibited in the units of the one level above the level corresponding to the number of inputs activated; for any one input activated counting inhibition is applied to the units of the level B, for any two units activated to the units of the level C and so forth.

FIG. 16 shows the detailed circuit arrangement of a typical unit (XYZ) of which the computer 10 is made up.

A relay XYZ is connected in the anode circuit of a valve VB; and the valve VB together with a valve VA forms a side-stable flip-flop circuit such that the relay XYZ is normally operated—a star at each of the contacts XYZ1–6 reminds the reader that these contacts are shown in their operated states.

A counting connection C to the unit is connected via a rectifier MRA and a condenser to the grid of the valve VB so that an input at C results in the relay XYZ releasing at the rate of one per second, determined by the clock relay CS of FIG. 13. This may be more easily visualised in the case of an isolated unit by imagining the operation at the same rate of the input simulating keys X, Y, Z 70 volt positive battery signal to the counting input C. The keys X, Y, Z are normally used for testing purposes which when a key MANUAL TEST is thrown connect a but for the purposes of understanding the operation of the computer they can represent counting connections in the computer from the inputs X, Y, Z. At this stage it is noted that counting due to activation of computer inputs can only occur when all the inputs X, Y, Z are activated simultaneously.

A counting input at the input C effects the successive release and reoperation of the relay XYZ so that a reservoir condenser CPA is progressively discharged to earth by the counting operation of contact XYZ5; a so-called bucket condenser is connected first to the condenser CPA and then to earth via a series rectifier pair MRB. The voltage on the grid of a cathode follower valve VC is the voltage on the condenser CPA, say $v_1$, which is passed on to a second counting circuit at the cathode of the cathode follower valve VC. A contact XYZ3 connects a second bucket condenser alternately to the cathode of the valve VC and to a second reservoir condenser CPB.

The second counting circuit thus generates from $v_1$ a voltage, say $v_t$, which is added to the voltage $v_1$ of the cathode of the valve VC by means of the contacts XYZ2, XYZ4; these contacts connect a sampling condenser alternately across the reservoir condenser CPB and, in series with the voltage $v_1$ of the point $x$.

The voltage $v_1+v_t$ appears on the connection $S_0$ to provide a supercontrol output (for units of the next higher level, FIG. 15); a contact XYZ1 removes a noise-suppressing earth from the connection $S_0$ when the voltage $v_1+v_t$ is applied; at the same time the cathode of the valve VA is earthed to ensure a satisfactory one second release of the relay XYZ when a supercontrol input for this purpose exists at $S_1$ and hence, on the grid of one of the valves VA of the side-stable flip-flop pair VA, VB.

A contact XYZ6 connects a battery output to the subcontrol connection $I_0$; an indicator lamp is provided to give a visual indication of relay XYZ operation for test purposes.

Computation of conditional probabilities requires that the voltage $v_1$ generated in a unit be compared with the voltage $v_1$ of a unit of the next higher level and to obtain this comparison, because the voltage $v_1$ is generated as an approximately logarithmic (strictly a hyperbolic) function, it is sufficient to subtract the two voltages. It is more convenient in a computer however to provide as in the unit of FIG. 16 a threshold voltage $v_t$ to add to the voltage $v_1$ of the lower unit and to compute the condition probability as an all-or-nothing i.e. binery) inference by deciding in the higher unit whether or not the voltage $v_1+v_t$ is greater than the voltage $v_1$ of the lower unit. This is achieved over the supercontrol connection between the two units.

It will be seen that the threshold voltage $v_t$ provided is a transient threshold; this avoids the errors which would result at high and low stored probability values and prevents inferences being made from other units which have not counted. An incidental advantage of the transient threshold used is that any errors due to the generation of the voltage $v_1$ as a hyperbolic function instead of a logarithmic function are reduced.

A point of interest is that, if no counting inputs occur for a time, the transient voltage $v_t$ decays exponentially with substantially the same time constant as any difference between the two voltages $v_1$ under comparison and consequently during the memory period of the units, and hence of the computer, no false inferences are made.

Suppression of supercontrol when the unit is on a level up-to and including the level corresponding to the number of inputs activated is achieved by the connection of the appropriate suppression output of the switching circuit of FIG. 17 to the terminal S (Suppression) of the unit. In the case of this unit, the XYZ unit, the S contact shown connected by the broken connection would be a contact of the relay SC and would, when operated, ensure that only inferences conditional to the whole input (X, Y and Z) are computed; it does this by suppressing any computation by false supercontrol.

Inhibition of counting in the unit when the unit is one on a level above the level corresponding to the number of inputs activated is achieved by the connection of the appropriate inhibition output of the switching circuit of FIG. 17 to the terminal T (Inhibition) of the unit. In the present unit, the XYZ unit, the T contact shown connected by the broken connection would be a contact of the relay TC and, when operated, would ensure that the bucketing contact XYZ3 would be ineffective.

FIG. 14 shows an example of a process control system in which control of a process control plant is achieved automatically by means of computed conditional probabilities.

A process control plant 26A possesses three control input terminals control (A, B and C). The plant 26A is arranged so that an earth on a control input lead A, B or C causes a small change in control of the process by operation internally of corresponding controlling elements.

The plant 26A possesses three output terminals F (A, B and C). These terminals are connected to relays FA, FB and FC respectively which are operated when the control in the plant 26A exerted by inputs at the control inputs control (A, B and C) respectively exceed chosen values.

Two further output terminals G (A and B) are also provided in the process control plant 26A and are connected to two relays GA and GB respectively. The arrangement in the plant 26A is such that when the measured output of the plant 26A falls within given limits an output appears on the output terminal G (A or B), according to the limits within which the measured output falls, to operate relay GA or GB.

A conditional probability computer 27 is coupled to the process control plant 26A by means of the relays FA, FB, FC, GA, GB and, additionally, relays CA, CB and CC. The relays CA, CB and CC are connected to outputs of the computer 27 and serve to apply control to the control inputs control (A, B and C) of the control plant 26A by means of the contacts CA1, CB1, and CC1 which connect a periodic clock signal to the control inputs control (A, B and C) from a common clock source, designated, for convenience Z.

Inputs are provided to the conditional probability computer 27 as follows:

Inputs FA', FB', FC' are connected by contacts FA1, FB1 and FC1 respectively in leads 28, 29 and 30 again respectively to the common clock source Z. Similarly inputs GA', and GB' are connected to the clock source Z via leads 31 and 32 in which contacts GA1 and GB1 respectively are connected. Manually operated switches IA and IB are provided to connect the clock source Z to the inputs GA' and GB' respectively through the leads 31 and 32.

Inputs CA', CB' and CC' are connected via leads 33, 34 and 35 respectively to the clock source Z the connection being controlled in each case by the contacts CA2, CB2 and CC2 respectively. A random input pulse source is connected at terminals RIA, RIB and RIC to the inputs CA', CB', CC' respectively.

The inputs FA', FB', FC', GA', GB', CA', CB', and CC' all connect, in the computer 27, to input units which are of the kind described in FIG. 12a for example. Conditional probability outputs from the computer 27 appear on the output terminals CA', CB' and CC' which, it will be remembered, are connected to the relays CA, CB and CC respectively.

In operation initially the random input pulses are applied to the inputs CA', CB' and CC' of the computer 27 and the relays CA, CB, CC operate from the corresponding outputs of the computer 27; whereupon the process control plant 26A is controlled via the control input terminals control (A, B and C) to effect random operation of the controlling elements in the plant 26A.

Outputs then appear on the output terminals F (A, B and C) to indicate the consequence of the control exerted by the controlling elements of the plant 26A in response to the random inputs. Further, an output also appears at one of the output terminals G (A and B) to indicate when the plant output has reached a predetermined value.

The information available at the output terminals F (A, B and C), G (A and B) of the plant 26A is fed into the computer 27 each time the relays associated with those terminals operate to connect the clock pulse source Z to the corresponding computer inputs over the connections 28, 29, 30, 31 and 32.

The computer 27 then computes conditional probabilities related to the control inputs control (A, B and C) of the plant 26A; and the system, as in the previous example, learns the consequences of its control corrections.

When the learning phase has been completed switch IA or IB is operated to connect the clock source Z to the computer 27 via the connections 31 and 32 accordingly as a given output value, corresponding to either the output G (A) or the output G (B) of the plant 26A, is desired. The conditional probability computer 27 then, according to the conditional probabilities it has computed and supplied at outputs CA', CB' and CC', operates the corresponding relays CA, CB, CC which at their contacts CA1, CB1 and CC1 respectively, connect the clock source Z to the control inputs control (A, B and C) of the plant 26A.

The clock source Z operates at a faster rate than the random input and accordingly the control is now effectively by means of pulses from the clock source Z under the control of the contacts CA1, CB1 and CC1. Each time a control input control (A, B or C) of the plant 26A is energized the clock source is connected via contacts CA2, CB2, CC2 to the inputs CA', CB', CC' of the computer 27 to provide the necessary inputs to the computer 27 relating to the operation of the internal controlling elements of the plant 26A.

A table of operations similar to that provided in the case of the motor-driven pointer described above could be constructed to illustrate the operation of the process control system.

It will be appreciated that the conditional probability principle is quite general and that different forms of conditional probability computer, other than those described herein, are possible. For instance a conventional digital computer can be programmed to compute conditional probabilities and so provide the computer for the automatic control system of the invention. It is noted though that such an alternative may not be as economical an undertaking as the use of a computer designed expressly to compute conditional probabilities.

Further development of automatic process control systems is possible.

For instance, the setting-in to the system of an instruction can be arranged to take place automatically. Suitable arrangements can be built on to the computer system to indicate by measurement of appropriate computed probabilities that a learning phase has been completed and then to effect the setting-in of a desired instruction.

It is further anticipated that automatic control systems of the kind described above can be used to monitor radio links and transmission lines for the signals used to modulate radio and television transmitters; here there are possibilities of random changes occurring in the closed control loops which are established to effect monitoring control and the control system could be made self-adjusting to offset such random changes.

We claim:

1. An automatic control system comprising a controlled element, one or more controlling means for controlling the behaviour of the controlled element by setting it into different states, first indicating means for indicating the state into which the controlled element is set by the controlling means, second indicating means for indicating the state of each controlling means as it controls the controlled element, and third indicating means for indicating the consequence of control of the controlled element, means for effecting random operation of the controlling means, a conditional probability computer comprising a plurality of inputs connected to the aforesaid indicating means, computing means fed from the inputs for computing occurrences in unit time of indications at the indicating means corresponding to indications at individual indicating means and also to indications of different sets of indicating means, comparison means for comparing computed occurrences whereby the probabilities of occurrences at inputs and sets of inputs conditional upon occurrences at individual inputs and sets of inputs is determined and computer outputs providing output signals representing computed probabilities of the states of the controlling means, each computer output being connected to the controlling means to which its signal relates, and system input means for applying input signals to the computer inputs connected to the third indicating means, which input signals then provide to the computer inputs indications of the consequences of control of the controlled element.

2. An automatic control system as claimed in claim 1, wherein in the computer means are provided for establishing arbitrary values of probability of consequences as limits which must be exceeded before the controlling means are actuated from the computer outputs.

3. An automatic control system as claimed in claim 2, wherein the computing means comprises means for counting occurrences of indications as logarithmically-based voltages.

4. An automatic control system as claimed in claim 2, wherein the computing means comprises a plurality of basic units each designated by a different received indication or a different set thereof and connected to indicating means according to its designated combination, each comprising a voltage-generating circuit for generating a voltage logarithmically related to the occurrence of an indication from its associated indicating means, and means connected with the units for comparing generated voltages between units to give conditional probability values.

5. An automatic control system as claimed in claim 4, wherein the voltage-generating circuit is a so-called incremental sampling circuit comprising a reservoir condenser, a sampling condenser, and means for effecting the charging of the sampling condenser from the reservoir condenser and its subsequent discharge successively for the duration of an occurrence.

6. An automatic control system as claimed in claim 5, wherein the voltage-generating circuit for a given basic unit comprises also a second incremental sampling circuit connected to its first incremental sampling circuit and thereby adapted to generate a threshold voltage logarithmically-based on the voltage across the reservoir condenser of the first incremental sampling circuit, means for adding the voltage generated in the first incremental sampling circuit to the threshold voltage generated in the second incremental sampling circuit, the means for comparing generated voltages being arranged to compare the sum of the added voltages with the voltage generated by the first incremental sampling circuit of a basic unit designated by a combination of indications containing one more received indication than the aforesaid given unit.

7. An automatic control system comprising a controlled element, one or more controlling means for controlling the behaviour of the controlled element by setting it into different states, first indicating means for indicating the state into which the controlled element is set by the controlling means, second indicating means for indicating the state of each controlling means as it controls the controlled element, and third indicating means for indicating the consequence of control of the controlled element, means for effecting random operation of the controlling means, a conditional probability computer connected to the indicating means and comprising a plurality of basic units each associated with a different received indication or a different set of received indications and each comprising a voltage-generating circuit for generating a voltage logarithmically related to the occurrence of its associated indication or set of indications, comparison means associated with the units for comparing generated voltages between units and thereby to compute conditional probability values, the comparison means being connected to the controlling means and actuating the controlling means according to computed conditional probabilities over-riding the random operation in doing so and means for establishing arbitrary probability values which the conditional probabilities of the states of the controlling means exceed before the controlling means are actuated and computer outputs providing output signals representing computed probabilities of the states of the controlling means, each computer output being connected to the controlling means to which its signal relates, and the system input means for applying input signals to computer inputs connected to the third indicating means, which input signals then provide to the computer inputs indications of the consequences of control of the controlled element.

8. An automatic control system as claimed in claim 7, wherein the voltage-generating circuit is a so-called incremental sampling circuit comprising a reservoir condenser, a sampling condenser, and means for effecting the charging of the sampling condenser from the reservoir condenser and its subsequent discharge successively for the duration of an occurrence.

9. An automatic control system as claimed in claim 8, wherein the voltage-generating circuit for a given basic unit comprises also a second incremental sampling circuit connected to its first incremental sampling circuit and thereby adapted to generate a threshold voltage logarithmically-based on the voltage across the reservoir condenser of the first incremental sampling circuit, means for adding the voltage generated in the first circuit to the threshold voltage generated in the second incremental sampling circuit, the means for comparing generated voltages being arranged to compare the sum of the added voltages with the voltage generated by the first incremental sampling circuit of a basic unit designated by a combination of indications containing one more received indication than the aforesaid given unit.

References Cited in the file of this patent

UNITED STATES PATENTS

| | | |
|---|---|---|
| 2,110,015 | FitzGerald | Mar. 1, 1938 |
| 2,445,800 | Mortlock | July 27, 1948 |
| 2,470,303 | Greenough | May 17, 1949 |
| 2,470,434 | Eckman et al. | May 17, 1949 |
| 2,503,213 | Philbrick | Apr. 4, 1950 |
| 2,549,873 | Williams | Apr. 24, 1951 |
| 2,759,138 | Andrews | Aug. 14, 1956 |